(12) United States Patent
Jetten et al.

(10) Patent No.: US 11,679,897 B2
(45) Date of Patent: Jun. 20, 2023

(54) AIRPLANE-DERIVED REFUSE UNLOADING SYSTEM

(71) Applicant: Alon Group Ltd., Barkan (IL)

(72) Inventors: Jan Jetten, Kiryat Gat (IL); Zohar Alon, Tel Aviv (IL)

(73) Assignee: Alon Group Ltd., Barkan (IL)

( * ) Notice: Subject to any disclaimer, the term of this patent is extended or adjusted under 35 U.S.C. 154(b) by 0 days.

(21) Appl. No.: 17/717,001

(22) Filed: Apr. 8, 2022

(65) Prior Publication Data

US 2022/0234824 A1 Jul. 28, 2022

Related U.S. Application Data

(60) Division of application No. 17/083,902, filed on Oct. 29, 2020, now Pat. No. 11,352,207, which is a continuation-in-part of application No. PCT/IL2019/050476, filed on Apr. 30, 2019.

(30) Foreign Application Priority Data

May 2, 2018 (IL) .......................................... 259106
Jan. 11, 2019 (EP) .................................... 19151351
Mar. 22, 2019 (EP) .................................... 19164513

(51) Int. Cl.
*B64F 1/32* (2006.01)
*B65F 3/14* (2006.01)
*B65F 3/20* (2006.01)
*B30B 9/30* (2006.01)

(52) U.S. Cl.
CPC .................. *B64F 1/32* (2013.01); *B65F 3/14* (2013.01); *B30B 9/3046* (2013.01); *B65F 3/201* (2013.01)

(58) Field of Classification Search
CPC .. B64F 1/32; B64F 1/322; B64F 1/324; B64F 1/326; B65F 3/14
USPC .................................................... 414/346, 397
See application file for complete search history.

(56) References Cited

U.S. PATENT DOCUMENTS

| 3,865,260 A | 2/1975 | Wieschel |
| 3,901,394 A | 8/1975 | Bowles |
| 4,544,320 A | 10/1985 | Haines |
| 4,576,540 A | 3/1986 | Derain et al. |
| 4,877,366 A | 10/1989 | De Filippi |

(Continued)

FOREIGN PATENT DOCUMENTS

| CN | 2404848 | 11/2000 |
| CN | 2628486 | 7/2004 |

(Continued)

OTHER PUBLICATIONS

European Search Report issued in European Application No. 19151351.4 dated Aug. 13, 2019.

(Continued)

*Primary Examiner* — James Keenan
(74) *Attorney, Agent, or Firm* — Snell & Wilmer L.L.P.

(57) ABSTRACT

An unloading system comprises an upper-opening chamber for receiving airplane-derived refuse, a chute, a chute-connected safety gate which is settable in falling preventing relation with respect to an access door of an airplane from which the refuse is unloadable into the chute and to the chamber, and an air brake assembly for immobilizing the safety gate when the chute ceases to be vertically displaced.

19 Claims, 25 Drawing Sheets

(56) References Cited

U.S. PATENT DOCUMENTS

| | | | |
|---|---|---|---|
| 5,857,822 A | 1/1999 | Christenson | |
| 6,007,291 A | 12/1999 | Ghibaudo | |
| 6,146,078 A | 11/2000 | Hamill et al. | |
| 7,077,615 B2 * | 7/2006 | Thogersen | B64F 1/324 |
| | | | 414/346 |

FOREIGN PATENT DOCUMENTS

| | | |
|---|---|---|
| EP | 728686 | 8/1996 |
| EP | 2559548 | 2/2013 |
| EP | 2933192 | 10/2015 |
| EP | 3564163 | 1/2022 |
| KR | 900008141 | 11/1990 |
| WO | 2006029491 | 3/2006 |
| WO | 2012133440 | 10/2012 |
| WO | 2019211839 | 11/2019 |

OTHER PUBLICATIONS

Office Action issued in European Application No. 19164513.4 dated Jul. 10, 2020.
Office Action issued in European Application No. 19164513.4 dated Jan. 3, 2020.
Office Action issued in European Application No. 19151351.4 dated Sep. 2, 2020.
USPTO, Notice of Allowance issued in U.S. Appl. No. 17/083,902 dated Mar. 29, 2022.
USPTO, Restriction Requirement issued in U.S. Appl. No. 17/083,902 dated Sep. 23, 2021.
USPTO, Ex Parte Qualye Action issued in U.S. Appl. No. 17/083,902 dated Jan. 28, 2022.
Alon Group.com, "The Swivel Sleeve Aircraft Refuse Collector", Garbage removal from aircraft—Alon Group—YouTube, https://www.youtube.com/watch?v=vB0vTFIml04, Jun. 14, 2011, 2 pages.
International Search Authority, International Search Report and Written Opinion issued in PCT/IL2019/050476 dated Sep. 5, 2019.
Office Action issued in European Application No. 19151351.4 dated Mar. 29, 2022.
Office Action issued in European Application No. 19151351.4 dated Mar. 15, 2021.
European Search Report issued in European Application No. 19164513.4 dated Oct. 10, 2019.
Office Action issued in European Application No. 19164513.4 dated Jan. 19, 2021.

* cited by examiner

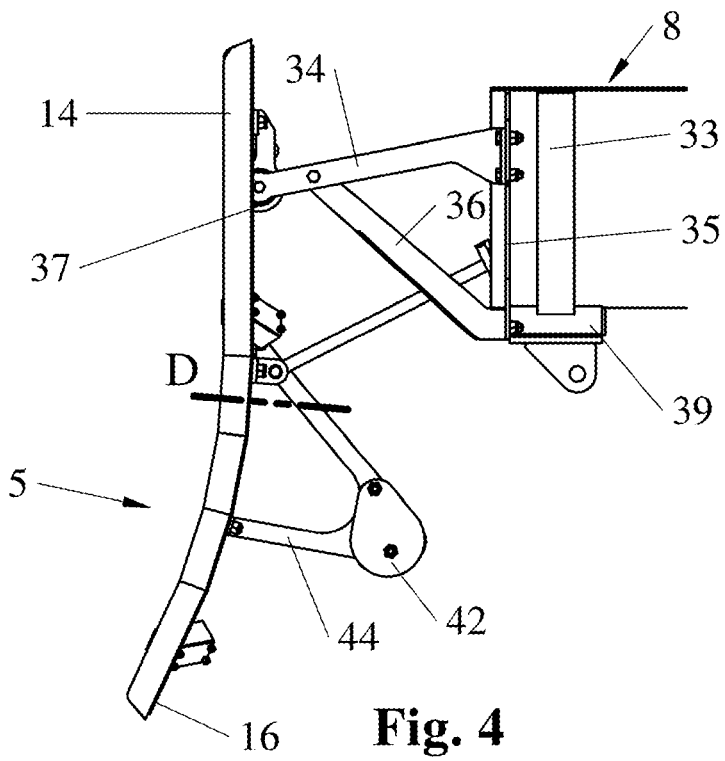
Fig. 4
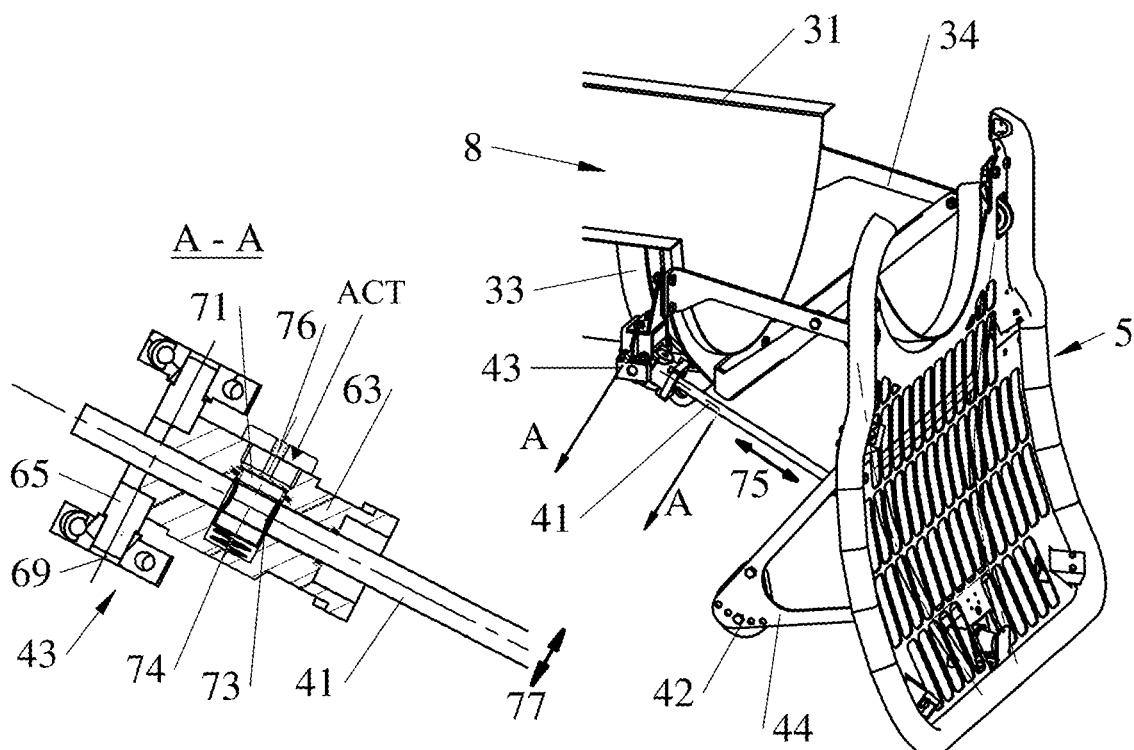
Fig. 5 A
Fig. 5

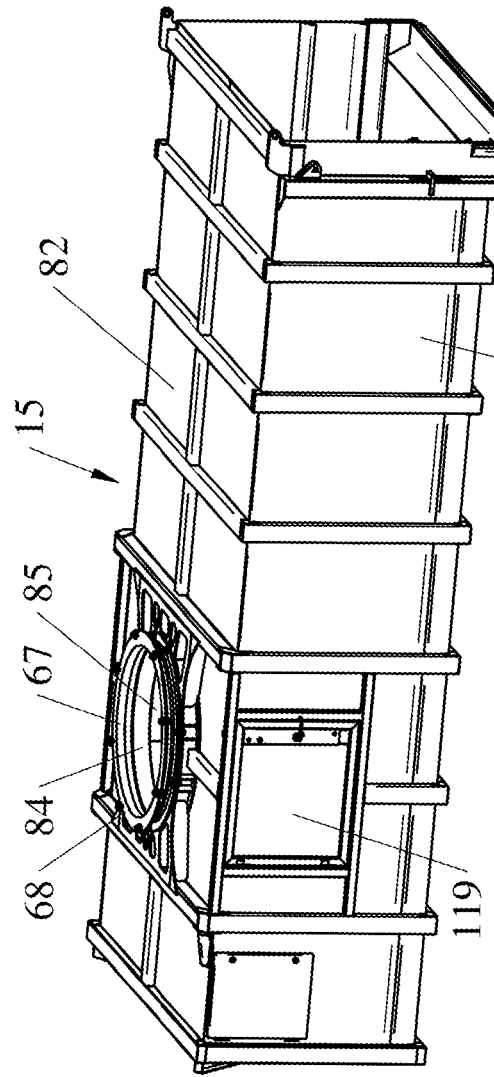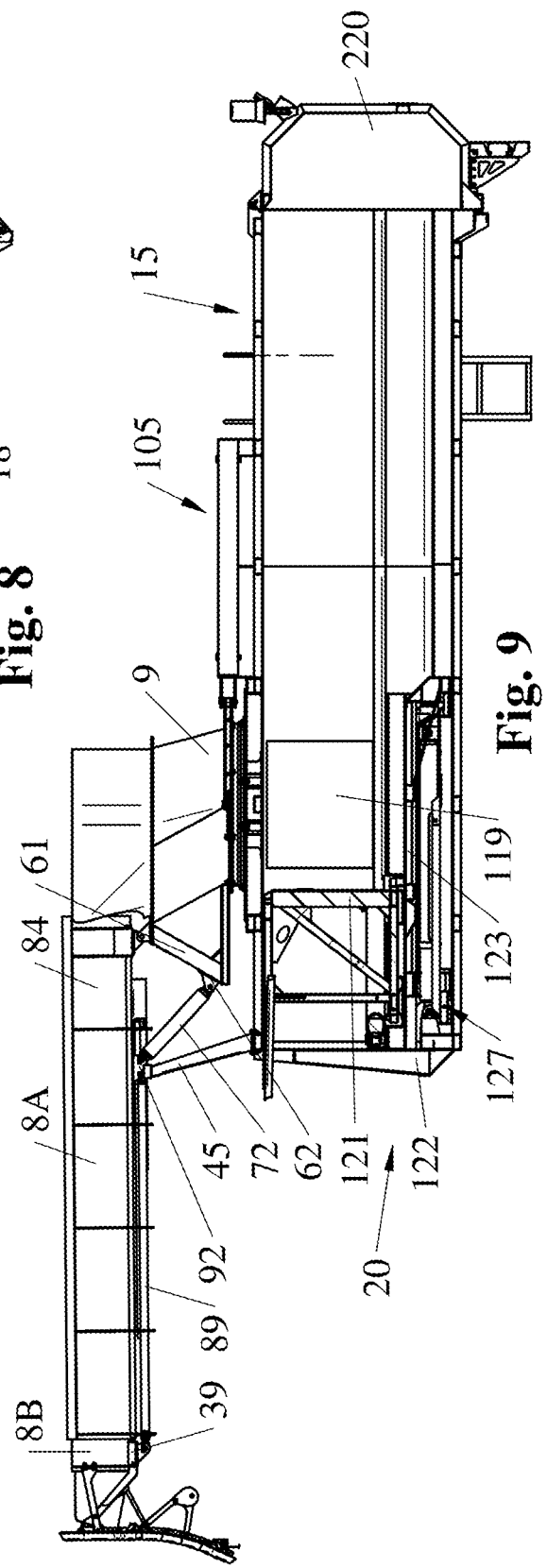

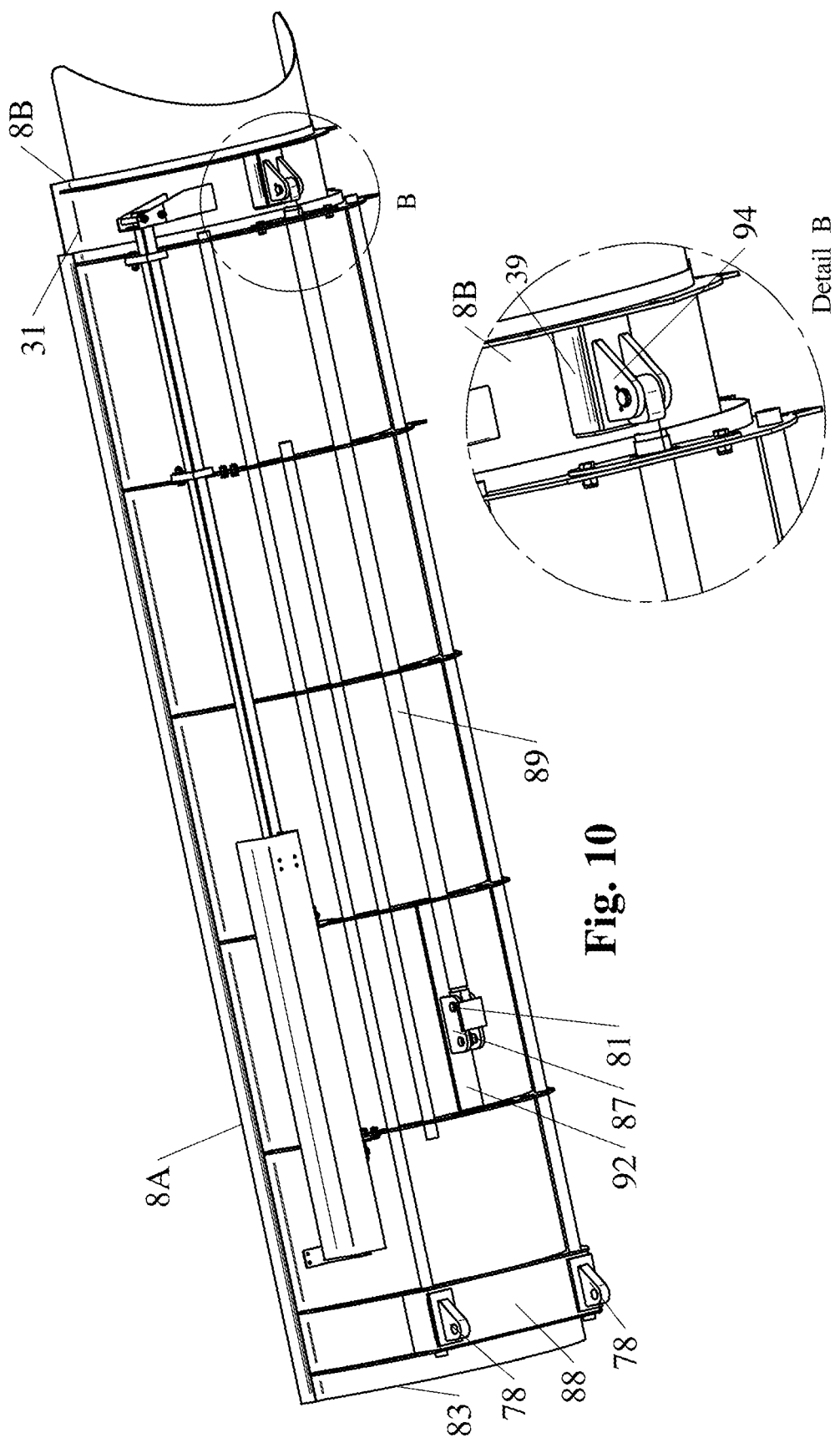

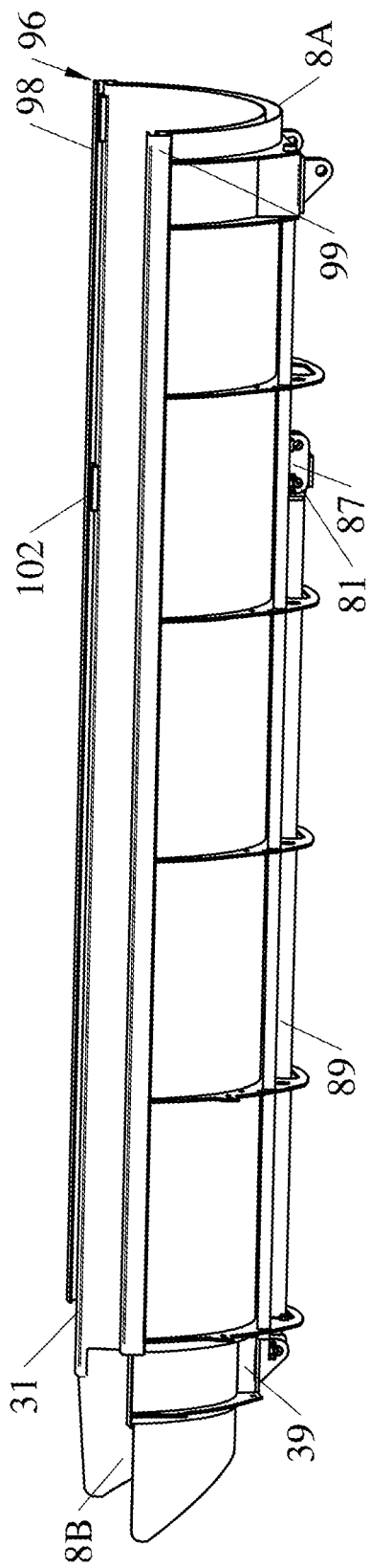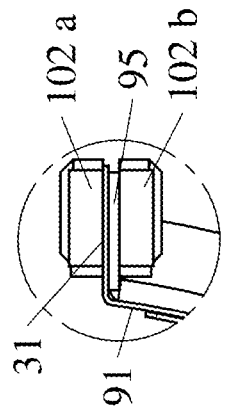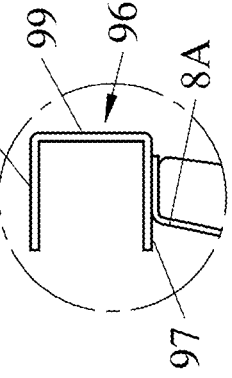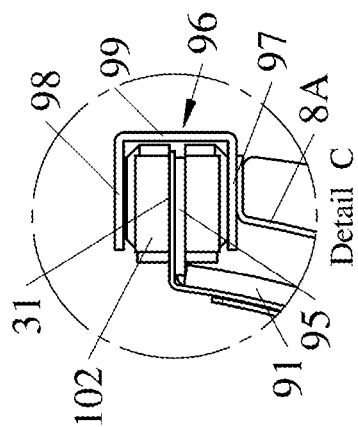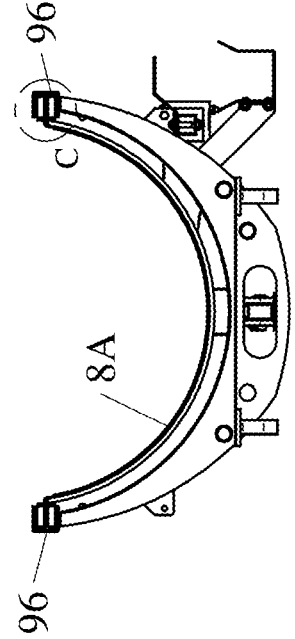

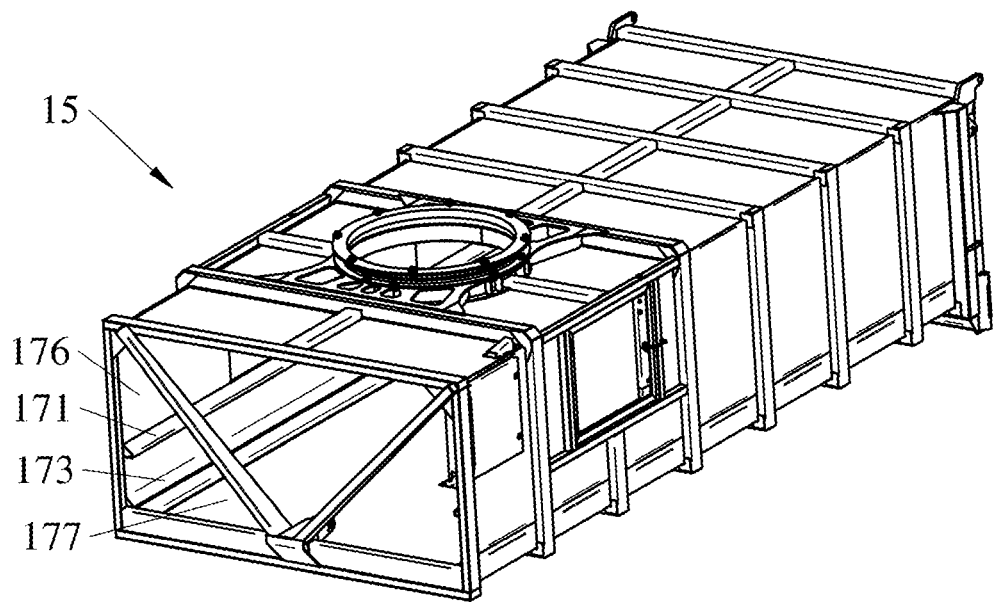
Fig. 20A
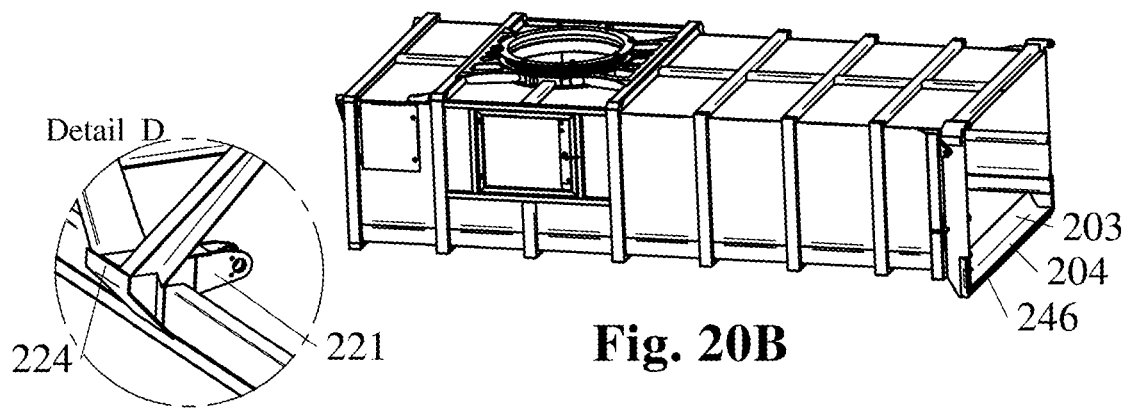
Fig. 20B
Fig. 20D
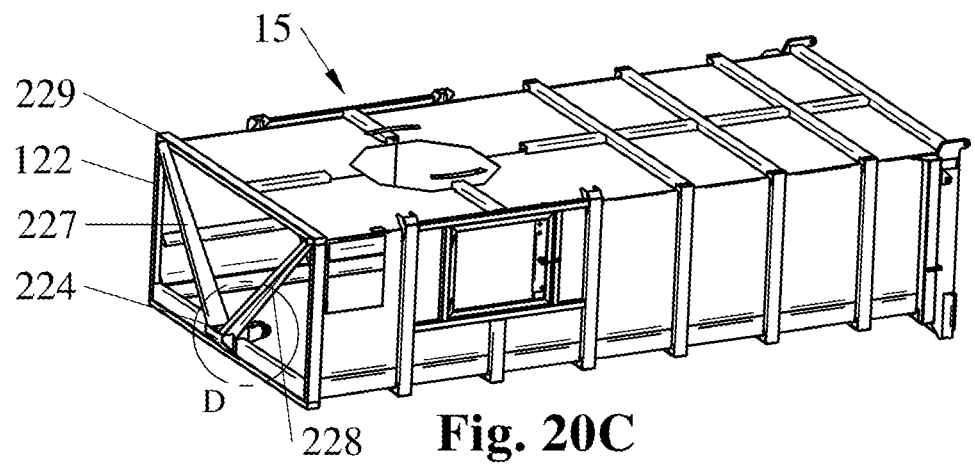
Fig. 20C

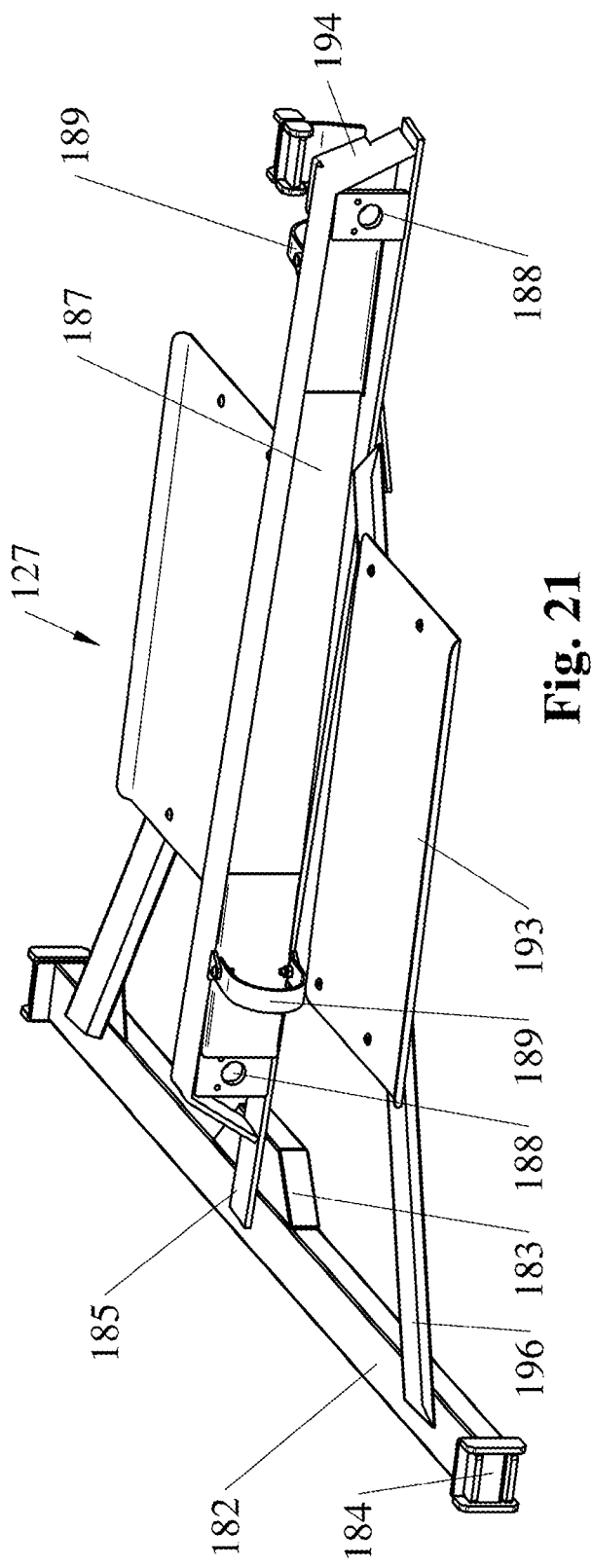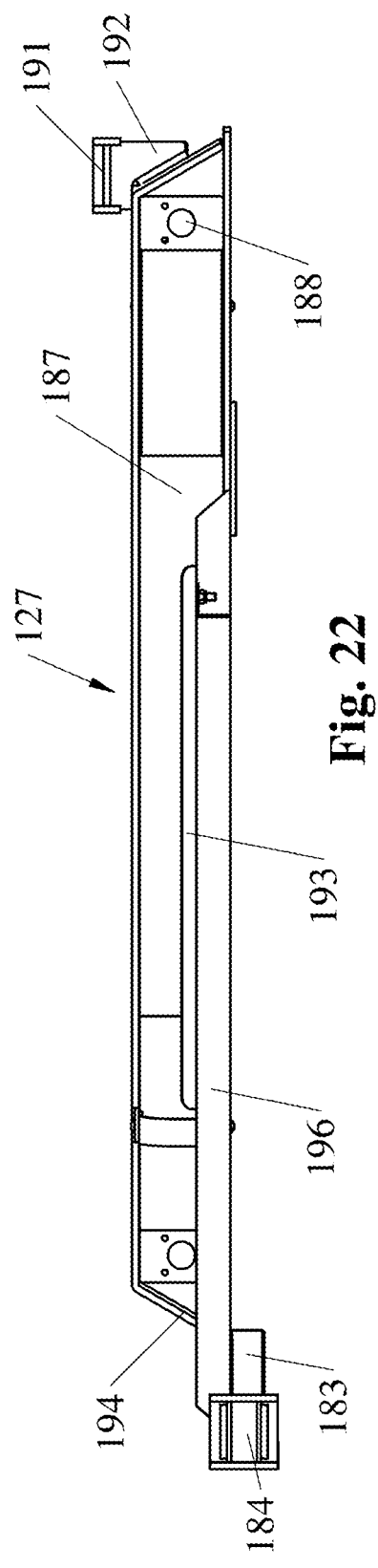
Fig. 21
Fig. 22

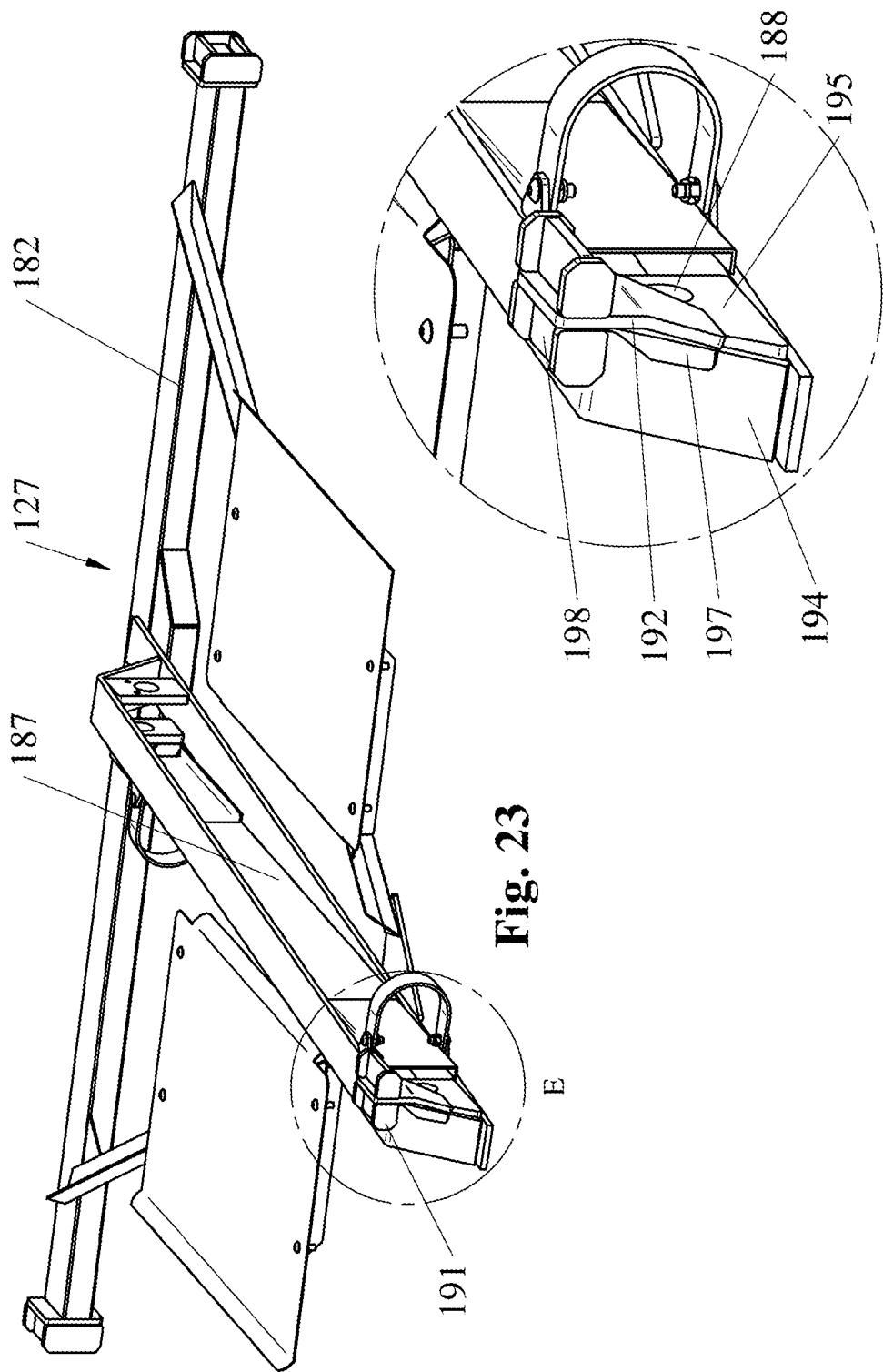

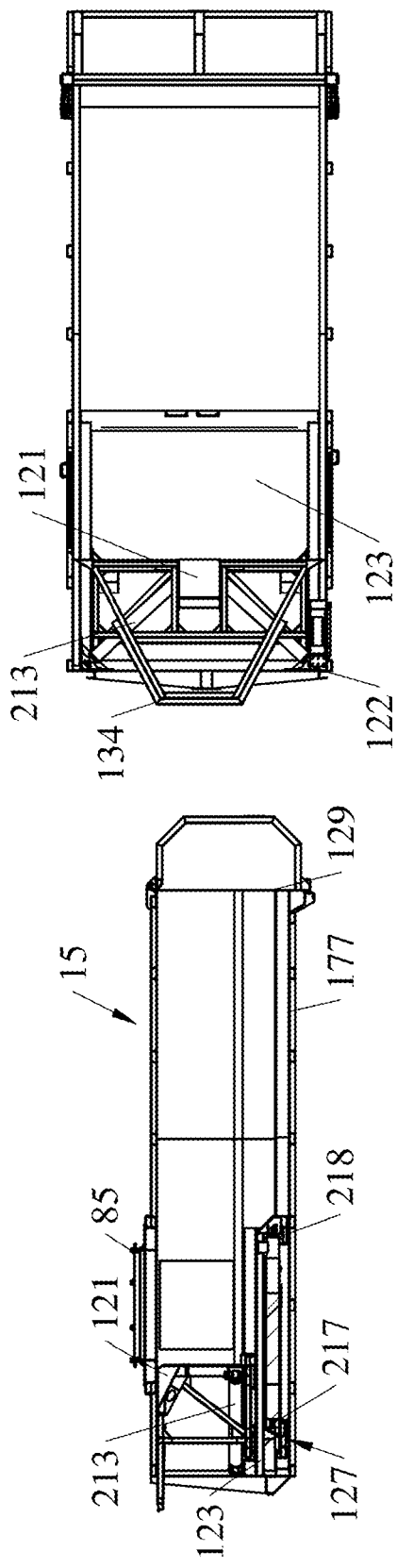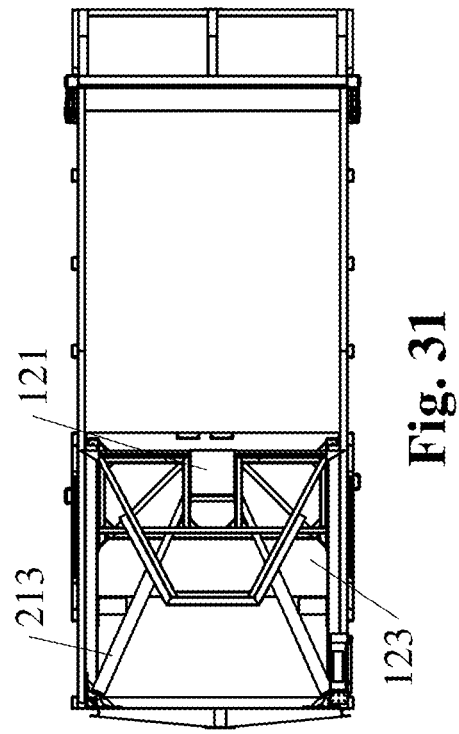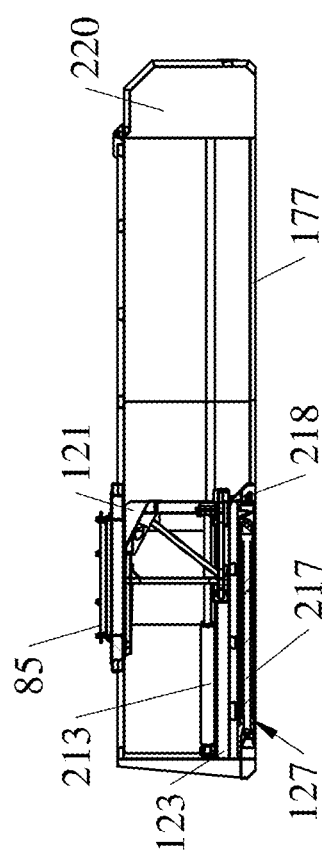

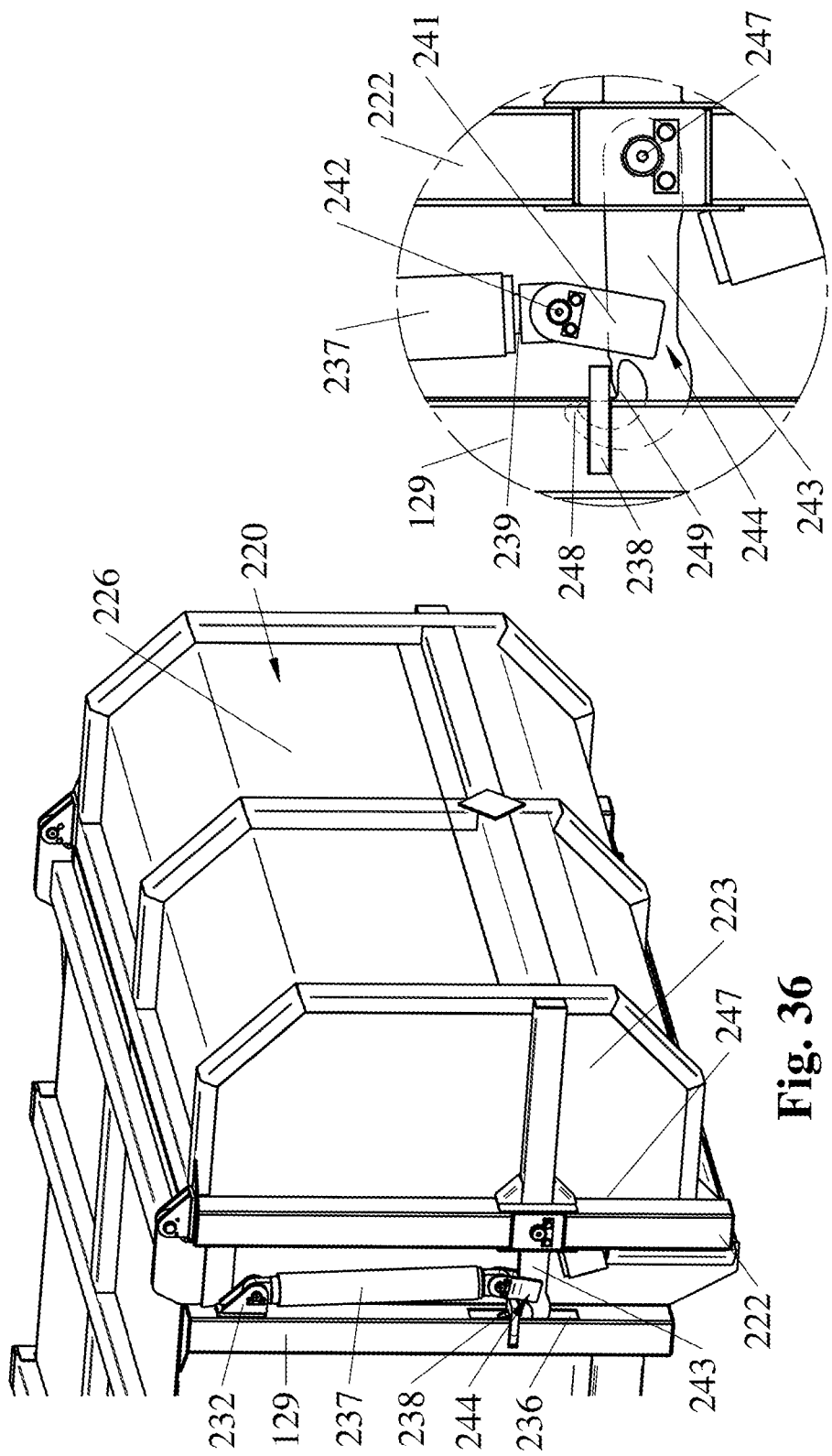

AIRPLANE-DERIVED REFUSE UNLOADING SYSTEM

CROSS REFERENCE TO RELATED APPLICATIONS

This application is a divisional of, and claims priority to, and benefit of U.S. patent application Ser. No. 17/083,902, filed on Oct. 29, 2020, which is a continuation in part of PCT Application No. PCT/IL2019/050476 filed Apr. 30, 2019, which claims priority to Israeli App. No. 259106 filed May 2, 2018, European Application No. 19151351.4 filed on Jan. 11, 2019 and European Application No. 19164513.4 filed on Mar. 22, 2019, which are incorporated herein in their entirety.

FIELD OF THE INVENTION

The present invention relates to the field of ground support equipment for airplanes. More particularly, the invention relates to a system and method for safely unloading and compacting airplane-derived refuse, while minimizing outward emission of unpleasant odors.

BACKGROUND OF THE INVENTION

In some prior art methods, refuse is manually collected in plastic bags and removed via the airplane staircase. This refuse unloading method is time consuming and unpleasant, and imposes an excessive load on expensive manpower.

In another prior method, the airplane cleaning staff collects the refuse after landing and removes bags of refuse via an access door to a service vehicle, such as a van body located at ground level or a catering vehicle that has been raised by a scissor lift mechanism and that has been fitted with a bridge extending to the access door. However, the airplane access door is at a height above ground level, on the average of 5 m, and the person opening the access door is at risk of falling. At times, one has to lean outwardly while the door is being opened before a protective platform is positioned. Even though a protective belt is extended across the width of the access door when completely opened, a distinct risk of falling nevertheless remains, particularly as the protective belt has to be detached when the access door is being opened or closed.

In another attempt to alleviate the safety risk, a chute through which refuse bags has been gravitationally conveyed from the access door to the service vehicle has been employed, while the service vehicle also served to compact the refuse. However, the person conveying the refuse bags through the access door was still at risk until the chute was properly positioned. Also, the service vehicle many times, upon directing the chute into position, impacted the airplane from which the refuse was unloaded and damaged its fuselage or wing when an excessive or uncontrolled force was transmitted to the chute.

An additional disadvantage of this approach was that, due to the configuration and operation of the compacting mechanism, the upper opening through which the refuse was introduced into the compaction chamber of the service vehicle was not completely occluded, and consequently refuse continued to be introduced into the compaction chamber even while the vertical press platen was involved in a compacting operation. The introduced refuse remained forwardly of the press platen, and therefore was unable to be compacted. Also, a telescopingly extendable hydraulic ram, which was used to displace the press platen the entire length of the compaction chamber until the refuse was discharged therefrom and was therefore of large dimensions and expensive to maintain, protruded forwardly from the compaction chamber, i.e. towards the driver's cabin, and refuse-derived liquids and solids exited the compaction chamber through the opening through which the ram protruded and soiled the surroundings as well as the exterior of the service vehicle.

It is an object of the present invention to provide a safe unloading system and method to facilitate personnel handling of airplane-derived refuse.

It is an additional object of the present invention to provide an unloading system and method for airplane-derived refuse that prevents damage to the airplane while being positioned.

It is an additional object of the present invention to provide a refuse compactor for receiving the unloaded refuse that is configured to facilitate compaction of a substantially uninterrupted supply of refuse from the airplane and discharge of the compacted refuse without requiring large-sized and expensive to maintain hydraulic rams.

It is yet an additional object of the present invention to provide a refuse compactor for receiving the unloaded refuse and that is configured to prevent the discharge of refuse-derived liquids and to thereby reduce the emission of unpleasant odors therefrom.

Other objects and advantages of the invention will become apparent as the description proceeds.

SUMMARY OF THE INVENTION

A safe airplane-derived refuse unloading system comprises a chamber for receiving airplane-derived refuse; a chute in communication with said receiving chamber, along which the refuse gravitates and from which it is dischargeable to said receiving chamber; a safety gate connected to said chute and which is settable in falling preventing relation with respect to an above-ground access door of an airplane from which the refuse is unloadable, said safety gate configured with an upper border element over which refuse elements are transferable via said access door into said chute; and an air brake assembly operatively connected to said safety gate, for immobilizing said safety gate when said chute ceases to be vertically displaced, to prevent personnel from accidently falling through said access door.

In one aspect, the receiving chamber is fixedly mounted on top of a platform of a transport vehicle and the chute is displaceable along two or more degrees of freedom to facilitate directing the safety gate to the access door, the unloading system further comprising a control system for preventing propulsion of the transport vehicle when the chute is being displaced.

In one aspect, the unloading system further comprises a funnel member operatively connected to the receiving chamber and to the chute, through which the gravitationally delivered airplane-derived refuse is discharged into the receiving chamber. The funnel member is configured with an upper receiving compartment, a lower refuse transfer compartment, and a mounting plate therebetween that surrounds an upper edge of said refuse transfer compartment.

In one aspect, the unloading system further comprises a lateral-position adjusting mechanism connected to an upper region of the receiving chamber and to a region of the funnel member. The region of the funnel member to which the lateral-position adjusting mechanism is connected is an annular rim extending outwardly from a bottom circular edge of the refuse transfer compartment, said rim being connected to a bearing fitted within an upper roof of the receiving chamber and around a circular wall delimiting an opening through which the transferred refuse is introduced into an interior of the receiving chamber.

The lateral-position adjusting mechanism may comprise a lateral-position adjusting piston pivotally connected to an upper region of the receiving chamber, a straight link pivotally connected to an upper region of the receiving chamber, and an arcuate link which is pivotally connected at a first end to an appendage fixedly connected to the annular rim and which is pivotally connected at a second end to an end of said straight link together with a terminal end of a rod of said lateral-position adjusting piston, to facilitate rotation of the funnel member at a substantially uniform speed in each rotational direction in order to adjust the lateral position of the chute.

In one aspect, the funnel member is additionally configured with two pairs of apertured supports extending upwardly from the mounting plate and proximate to a chute-facing edge thereof to facilitate pivotal displacement of the chute about a horizontal axis defined by a pin inserted within each of said apertured supports and within corresponding apertured supports protruding proximate to a funnel-facing end of the chute; a sloped brace extending downwardly from the chute-facing edge of the mounting plate; and a pair of apertured supports projecting from a bottom of the sloped brace for pivotal connection with a vertical-position adjusting piston, wherein a rod of the vertical-position adjusting piston is pivotally connected to an intermediate region of the chute by a force multiplier arrangement.

In one aspect, the chute has an upwardly facing opening, and is configured with outer and inner sections that are slidable one with relation to the other, and with a length-adjusting piston interconnecting said outer and inner sections in order to facilitate an extension or retraction operation.

In one aspect, the safety gate has a curved profile with an upper substantially vertical section and a lower section that downwardly and concavely curves from a region at a bottom of the vertical section in such a way that a bottom border element of the safety gate is more spaced from the chute than the vertical section in order to accommodate curvature of a fuselage of the airplane from which the refuse is unloadable.

In one aspect, the safety gate is configured with a peripheral border which includes the bottom border element that is adapted to be positioned at approximately a height of an airplane cabin floor, opposed lower side border elements that extend upwardly from, and substantially perpendicular to, the bottom border element and that have a width therebetween greater than the width of the access door, opposed upper side border elements that are laterally spaced by a width therebetween narrower than the width between the lower side border elements to prevent interference with upper hinges of the access door which is opened, and the upper border element which is located above and between the lower side border elements.

In one aspect, the safety gate has a regulation-conforming height defined by the lower side border elements and the upper side border elements of at least 1050 mm.

In one aspect, the unloading system further comprises two bars which are each fixedly connected to the chute and pivotally connected to a chute-facing region of the safety gate to define a pivot axis, and one or more counterweights connected to the safety gate and located below the pivot axis when the safety gate is set in falling preventing relation with respect to the access door, wherein a weight and relative location of said one or more counterweights are selected to produce a counterbalancing, self-righting moment following a controlled movement of the chute.

In one aspect, the unloading system further comprises an elastomeric peripheral covering coupled to the peripheral border for preventing damage to an airplane body if inadvertently contacted by the safety gate.

In one aspect, the unloading system further comprises contact detecting apparatus in data communication with a control module, said control module operable to disable movement of the chute when approaching the airplane by a distance of less than 150 mm.

In one aspect, the receiving chamber is a compaction chamber, the unloading system further comprising a compacting system provided within the compaction chamber for compacting the received airplane-derived refuse.

A method for unloading airplane-derived refuse comprises the steps of providing a safety gate connected to a chute which is in communication with an upper-opening compaction chamber for receiving airplane-derived refuse; providing a platen mount which is configured with a substantially vertical and rearwardly positioned platen and with an occluding surface located below said upper opening for occluding said upper opening, said occluding surface being configured with a recessed surface that is inclined with respect to said occluding surface; setting said safety gate in falling preventing relation with respect to an above-ground access door of an airplane from which the refuse is unloadable; transferring refuse elements via said access door over an upper border element of said safety gate into said chute, allowing the refuse elements to gravitate along said chute and to be discharged to said receiving chamber; and activating one or more force transmitting elements in controllable driving engagement with said main platen mount so as to periodically or intermittently drive said main platen mount linearly, without being subjected to interference with clogged refuse elements located between said main platen mount and a roof of said compaction chamber by virtue of influence of said recessed surface, between a first position at which said main platen mount is located completely forwardly of said upper opening to enable introduction of the refuse elements through said upper opening, and a second position spaced rearwardly from said first position at which said upper opening is completely occluded by said occluding surface to prevent additional refuse elements from being introduced into an interior of said compaction chamber, said one or more force transmitting elements always being retained within the interior of said compaction chamber.

A top-loaded refuse compacting system comprises a compaction chamber configured with an upper opening through which refuse is introducible; a main platen mount configured with a substantially vertical and rearwardly positioned main platen and with an occluding surface for occluding said upper opening; one or more main force transmitting elements in controllable driving engagement with said main platen mount that are always retained within an interior of said compaction chamber; an auxiliary platen mount adapted to movably support the main platen mount thereunder and which is in controllable driving engagement with the main platen mount by the one or more main force transmitting elements, the auxiliary platen mount configured with a substantially horizontally disposed refuse-receiving surface on which the introduced refuse is able to fall and with a rearwardly positioned auxiliary platen with which the main platen is alignable; a holder assembly movably positioned underneath the auxiliary platen mount; and a plurality of additional force transmitting elements that are operatively held by the holder assembly and that are always retained within the interior of the compaction chamber, at least one of the additional force transmitting elements in controllable driving engagement with the auxiliary platen mount and at least one of the additional force transmitting elements in controllable driving engagement with a region of the compaction chamber, wherein said one or more main force transmitting elements are adapted to periodically or intermittently drive said main platen mount linearly between a first position at which said main platen mount is located completely forwardly of said upper opening to enable introduction of refuse through said upper opening, and a second position spaced rearwardly from said first position at which said upper opening is completely occluded by said occluding surface to prevent additional refuse from being introduced into an interior of said compaction chamber, wherein said main platen is adapted to deflect the introduced refuse rearwardly when said main platen is driven from said first position to said second position, wherein the main platen mount is adapted to deflect refuse located on the refuse-receiving surface onto a floor of the compaction chamber, wherein the main platen mount, auxiliary platen mount, and holder assembly are rearwardly and linearly displaceable in unison to a third position by a first distance relative to the second position, to displace the deflected refuse by the main platen and auxiliary platen, and wherein the main platen mount and the auxiliary platen mount are rearwardly and linearly displaceable in unison to a fourth position by a second distance relative to the third position, to additionally displace the deflected refuse and to enable outward discharge thereof from the compaction chamber.

In one aspect, the occluding surface is substantially horizontally disposed and located within 5 cm of a roof of the compaction chamber. The compaction chamber roof prevents forward movement of a piece of refuse when the main platen mount is displaced from the second position to the first position.

In one aspect, the occluding surface is configured with a recessed ramped surface for preventing deformation of the roof of the compaction chamber when the introduced refuse becomes clogged between the main platen mount and the roof.

In one aspect, a length of the occluding surface is no more than 20% of the length of the compaction chamber.

In one aspect, the occluding surface is configured with an upwardly open channel attached to peripheral edges thereof, for receiving refuse-derived liquids contacted by the main platen during a compaction operation and transferred to the occluding surface, the received refuse-derived liquids being dischargeable from said channel to the compaction chamber floor via one or more drainage openings formed in the refuse-receiving surface of the auxiliary platen mount.

In one aspect, a first lengthwise extending guide rail is fixed to a corresponding side wall of the compaction chamber and is configured to receive one or more corresponding linear bearings that are held by the corresponding side of the auxiliary platen mount, to facilitate lengthwise displacement of the auxiliary platen mount.

In one aspect, a second lengthwise extending guide rail is connected to each corresponding lateral side of the refuse-receiving surface of the auxiliary platen mount and is configured to receive one or more corresponding linear bearings that are held by the corresponding side of the main platen mount, to facilitate displacement of the main platen mount relative to the auxiliary platen mount.

In one aspect, a rearwardly open, angled bracket is affixed to an upper surface of a corresponding second rail at a forward end thereof and a corresponding pivot mount is attached to said angled bracket, and wherein an oblique hydraulic cylinder is pivotally connected to the corresponding pivot mount of the auxiliary platen mount and a piston rod of the oblique cylinder is pivotally connected to a corresponding pivot mount provided at a central region of the main platen mount, for increasing a compacting force applied by the oblique cylinder even though its stroke is limited by a length equal to a distance between the first and second positions.

In one aspect, the holder assembly comprises a forwardly positioned, laterally extending beam which is provided at each end with one or more linear bearings that are each received in a corresponding first guide rail, to facilitate lengthwise displacement of the holder assembly, a centrally located, lengthwise extending support member, and at least one linear bearing held at a rearward region, and above an upper surface, of said support member, and received within a coupler which is secured to an underside of the refuse-receiving surface of the auxiliary platen mount.

In one aspect, the holder assembly has a tapered configuration, such that its width progressively decreases in a rearward direction relative to the forwardly positioned beam, and lengthwise ends of the support member are triangularly shaped, to facilitate manipulation of a cleaning implement at peripheral ends of the holder assembly in order to completely clear refuse from the compaction chamber floor.

In one aspect, the compacting system further comprises a pivotally displaceable, three-dimensional door member which is configured, when set to a closed position at a rear opening of the compaction chamber, to receive within its interior the deflected refuse, and, when set to an open pivoted position, to allow the deflected refuse to be outwardly discharged to a waste disposal site.

In one aspect, a rearward end of the compaction chamber floor is configured with a recessed portion within which incompressible pieces of refuse are collectable and from which the incompressible pieces of refuse are dischargeable following a compacting operation.

In one aspect, the compacting system further comprises a control system for disabling operation of the additional force transmitting elements when the door member is set to the opened position.

In one aspect, the compacting system further comprises a transport vehicle to which the compaction chamber is secured, for transporting the compaction chamber to a location proximate to an airplane to facilitate introduction of airplane-derived refuse through the upper opening and for subsequently transporting the compaction chamber to the waste disposal site to facilitate discharging of the refuse from the compaction chamber.

In one aspect, the compacting system further comprises a control system for disabling operation of components for facilitating introduction of the airplane-derived refuse through the upper opening if the auxiliary platen mount is not located at a forwardmost position.

A method for compacting airplane-derived refuse comprises the steps of providing within an upper-opening compaction chamber, a main platen mount which is configured with a substantially vertical and rearwardly positioned main platen and with an occluding surface located below said upper opening for occluding said upper opening, and an auxiliary platen mount adapted to movably support the main platen mount thereunder and which is in controllable driving engagement with the main platen mount by the one or more main force transmitting elements, the auxiliary platen mount configured with a substantially horizontally disposed refuse-receiving surface on which the introduced refuse is able to fall and with a rearwardly positioned auxiliary platen with which the main platen is alignable; receiving gravitationally displaced airplane-derived refuse via a chute and said upper opening while said occluding surface is located completely forwardly of said upper opening and within an interior of said compaction chamber, until said received refuse is deposited above said refuse-receiving surface; rearwardly driving the main platen mount linearly while being slidably engaged with the auxiliary platen mount, until said upper opening is occluded by said occluding surface and the main platen is located rearwardly of said upper opening, to deflect refuse located on said refuse-receiving surface onto a floor of the compaction chamber and to cause said deflected refuse to be compressed to a certain degree.

In one aspect, the upper opening is spaced from a forward edge of the compaction chamber by a distance of less than one-quarter of a length of the compaction chamber, and the main platen mount is driven rearwardly by a distance greater than at least 200 mm more than a lengthwise dimension of the upper opening.

BRIEF DESCRIPTION OF THE DRAWINGS

In the drawings:

FIG. 4 is a side view of FIG. 3, shown when the chute is at a horizontal orientation;

FIG. 5 is a perspective view from the top and side of FIG. 3;

FIG. 5A is a cross sectional view of the air brake assembly of FIG. 5, cut along plane A-A;

FIG. 8 is a perspective view from the top of a compaction chamber used in conjunction with the unloading system and compaction system of FIG. 1, when separated from the transport vehicle, shown without a rear door member;

FIG. 9 is a side, partial cutaway view of the unloading system of FIG. 1, when separated from the transport vehicle;

FIG. 10 is a perspective view from below of a chute used in conjunction with the unloading system of FIG. 1;

FIG. 10A is an enlargement of Detail B of FIG. 10;

FIG. 11A is a perspective view from the side and top of the chute of FIG. 10;

FIG. 11B is a rear view of the chute of FIG. 11A;

FIG. 11C is an enlargement of Detail C of FIG. 11B;

Figure 1:
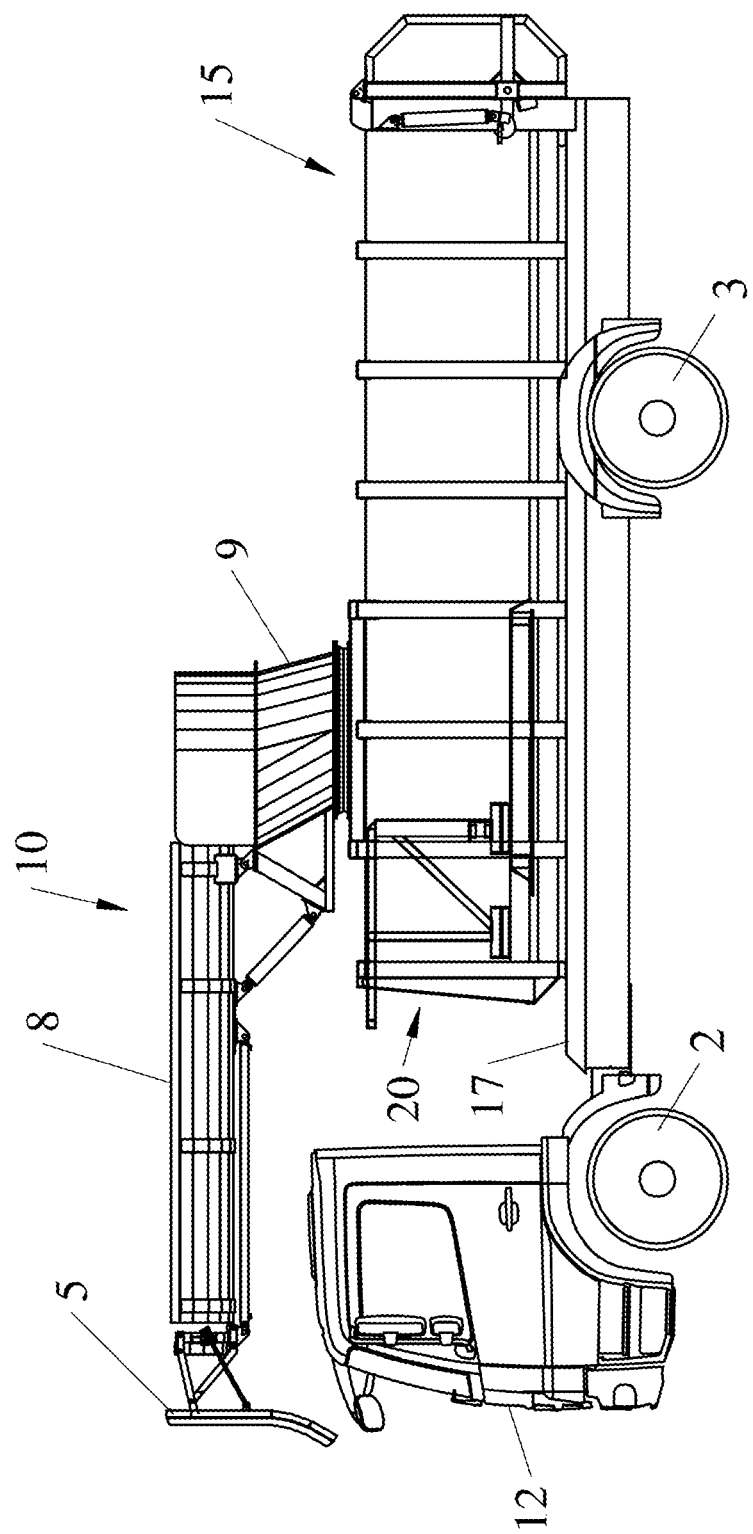
FIG. 1 is a schematic illustration from the side of an unloading system and a compacting system, according to one embodiment of the present invention, which are mounted on a transport vehicle, shown when a refuse conveying chute is in a starting horizontal position.
Figure 12:
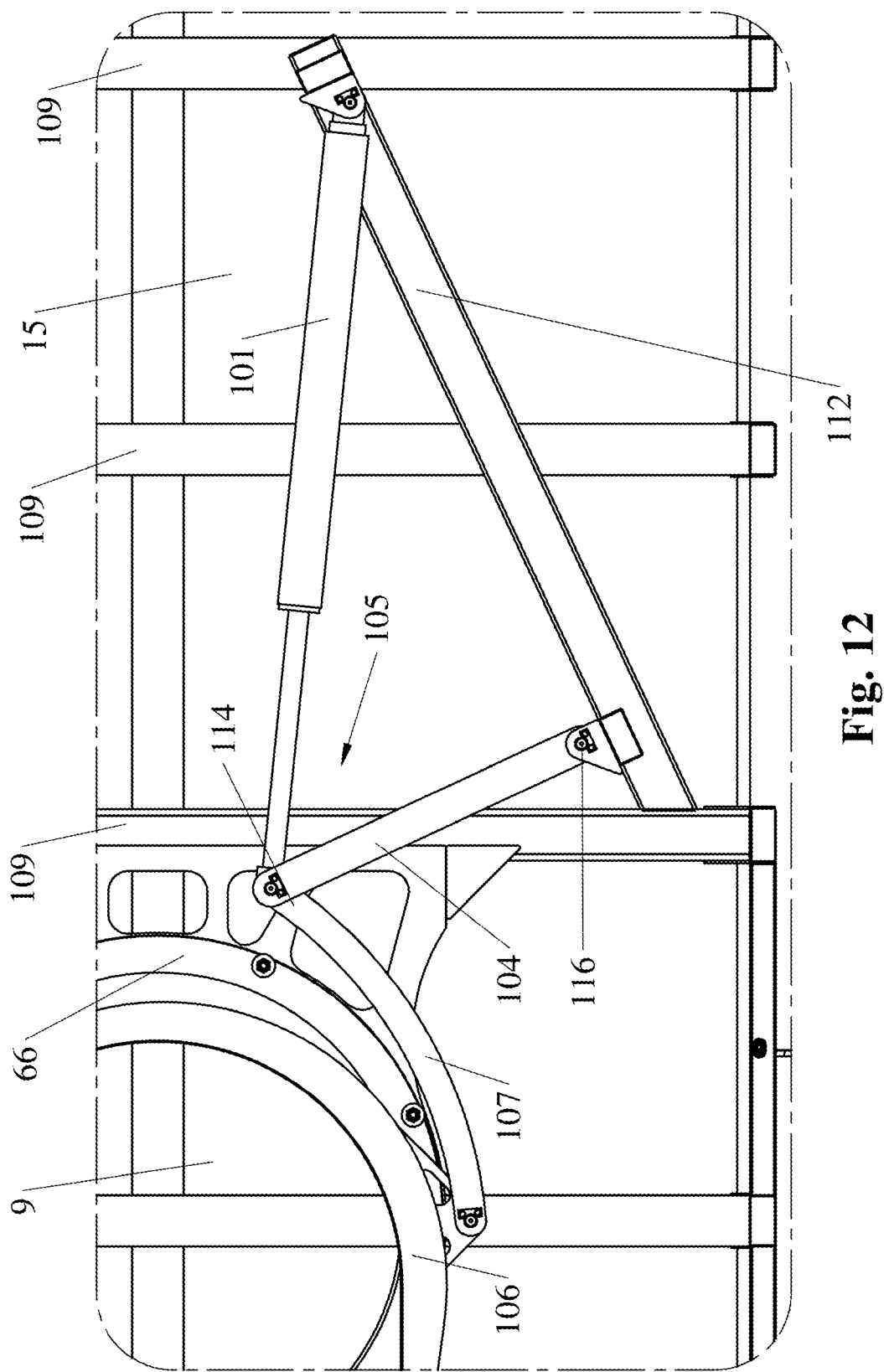
Figure 13:
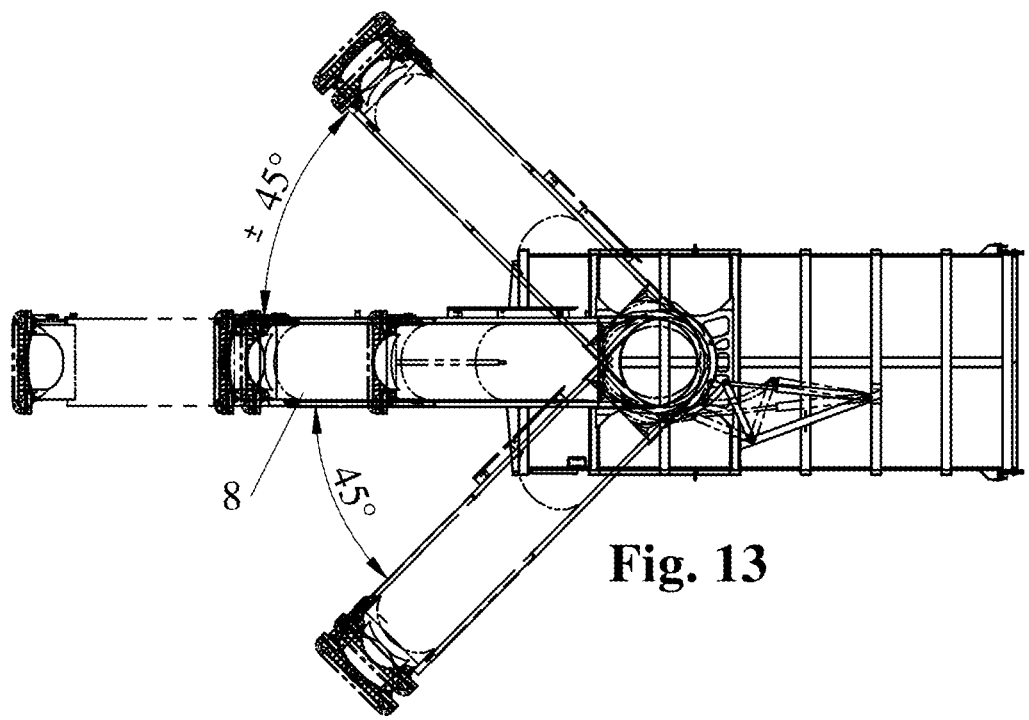
Figure 14:
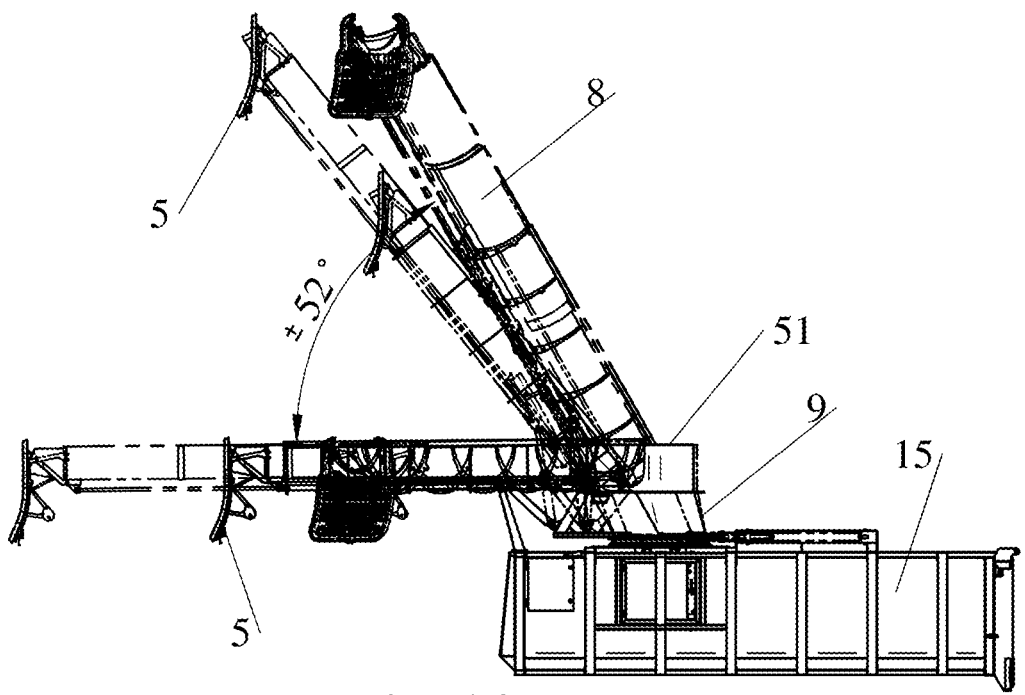
Figure 15:
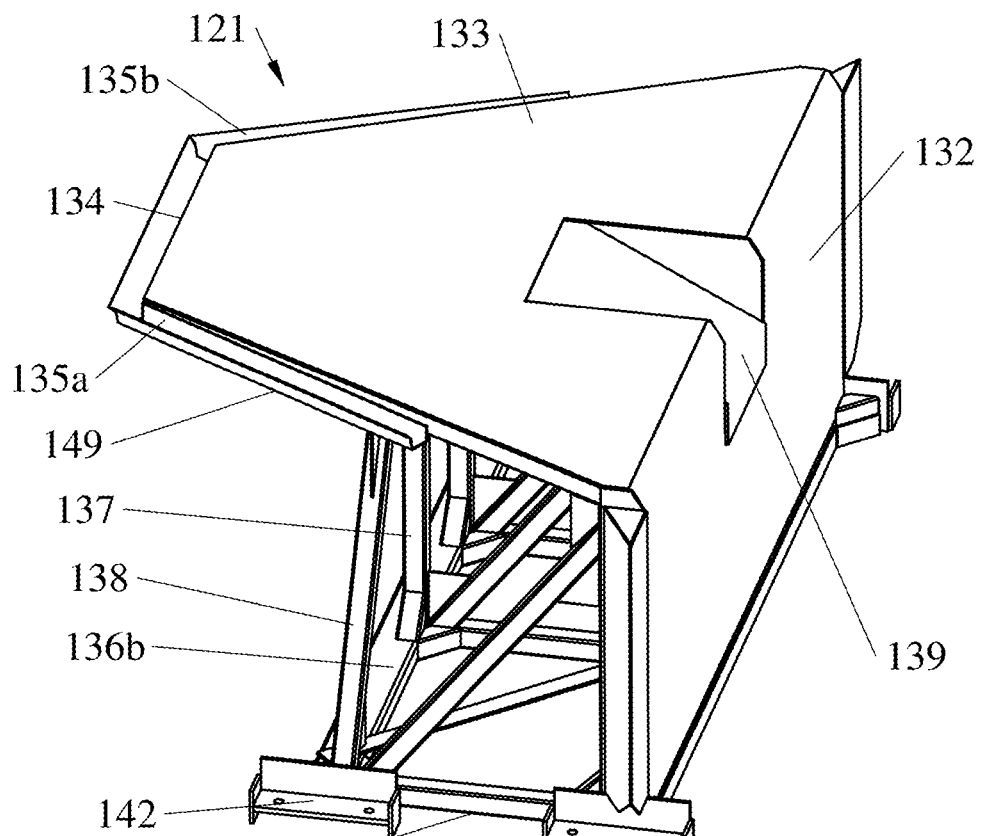
Figure 16:
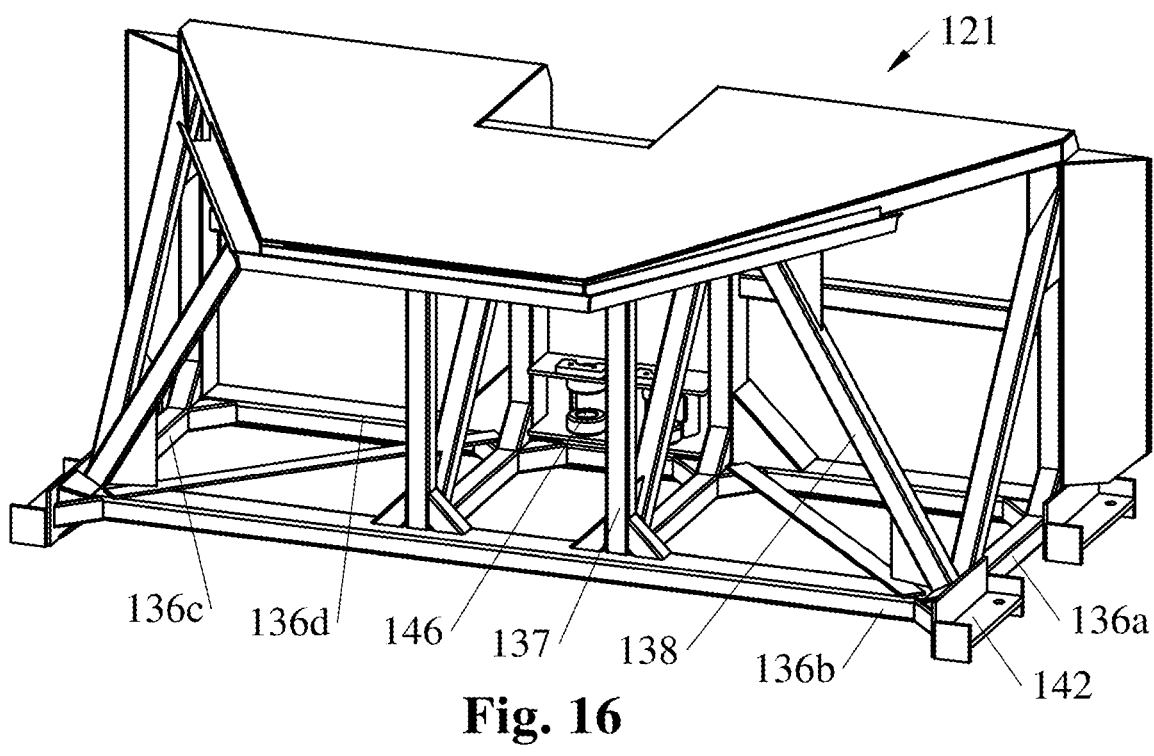
Figure 17:
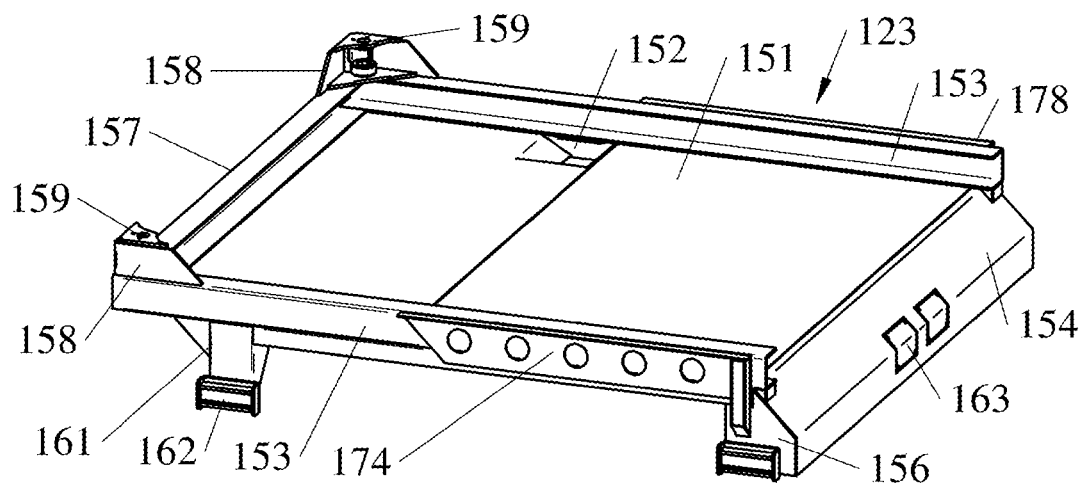
Figure 18:
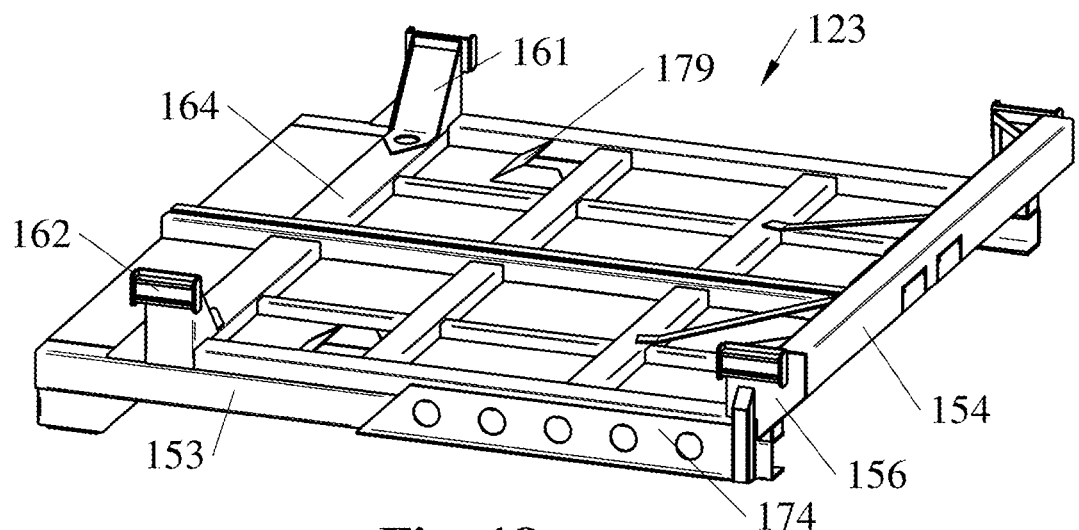
Figure 19:
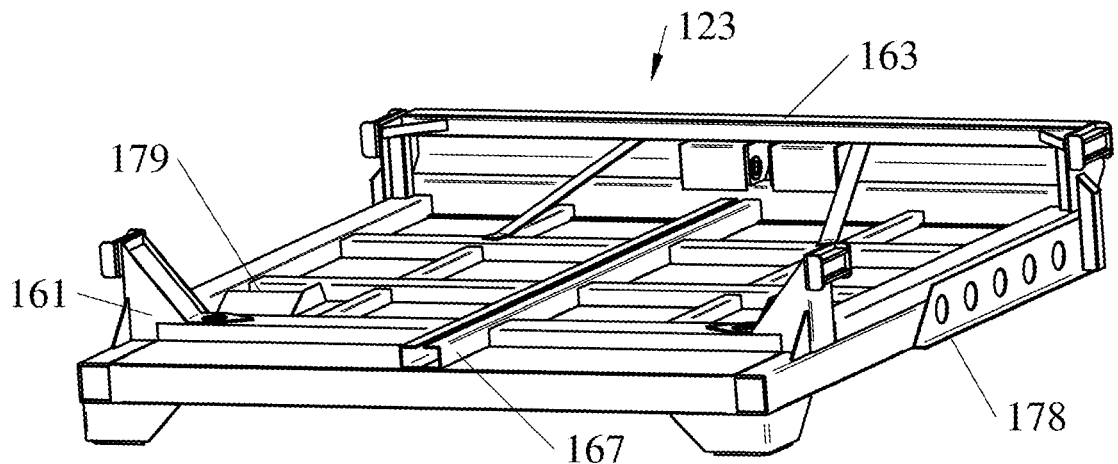
Figure 25:
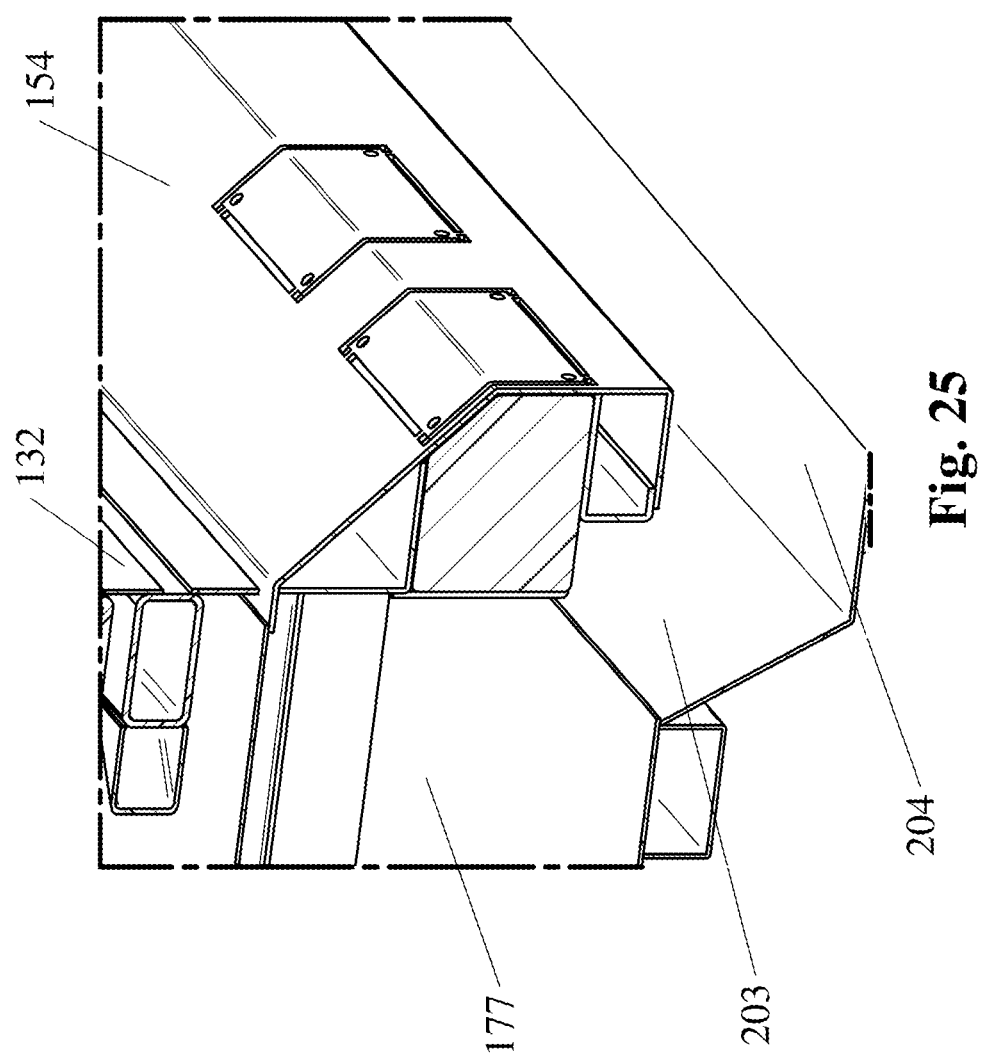
Figure 26:
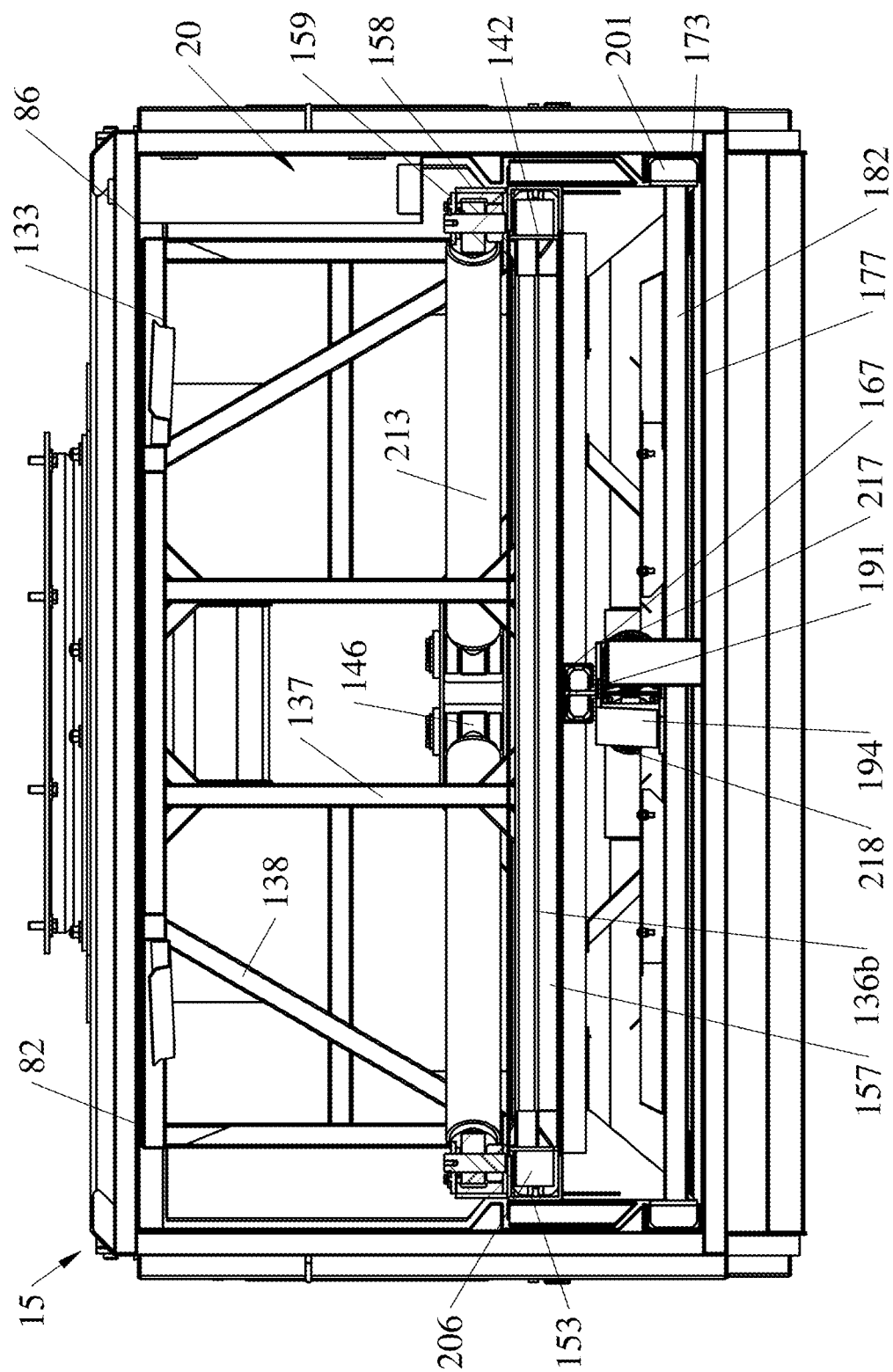
Figure 27:
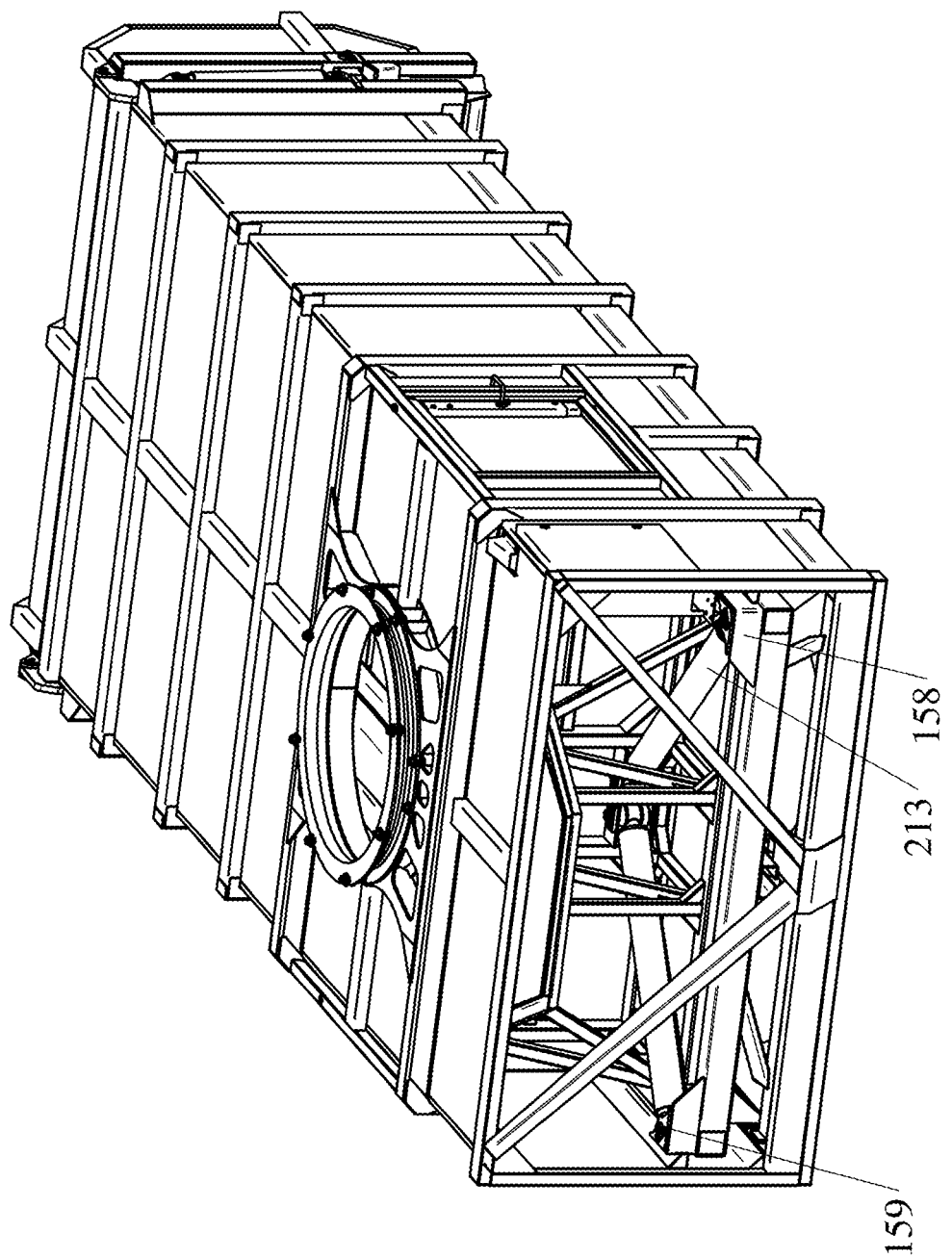
Figure 38:
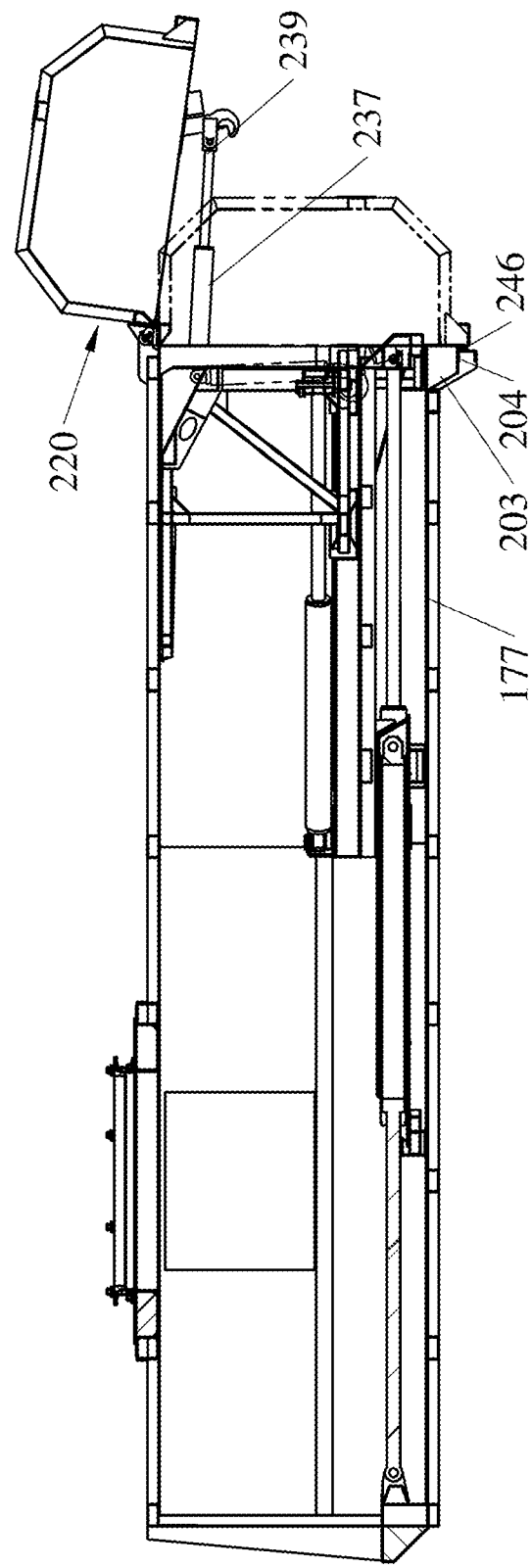
Figure 39:
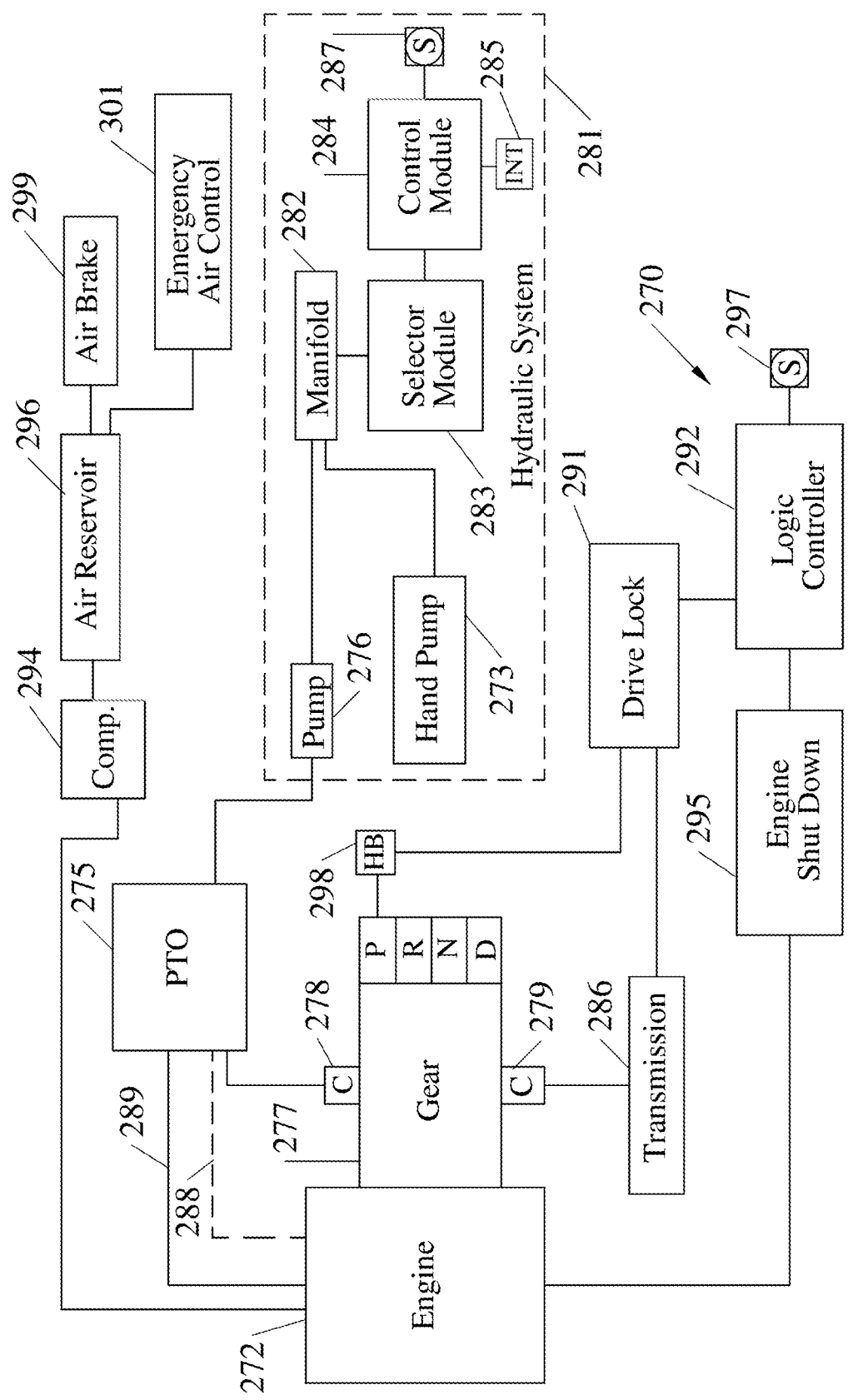
Figure 40A:
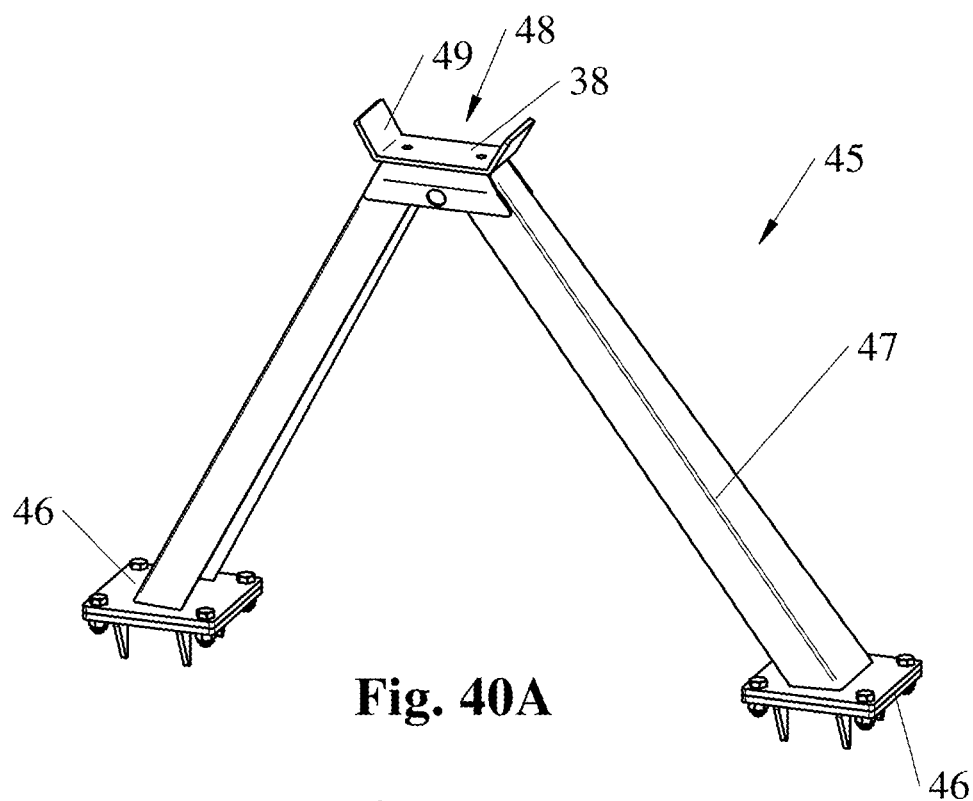
Figure 40B:
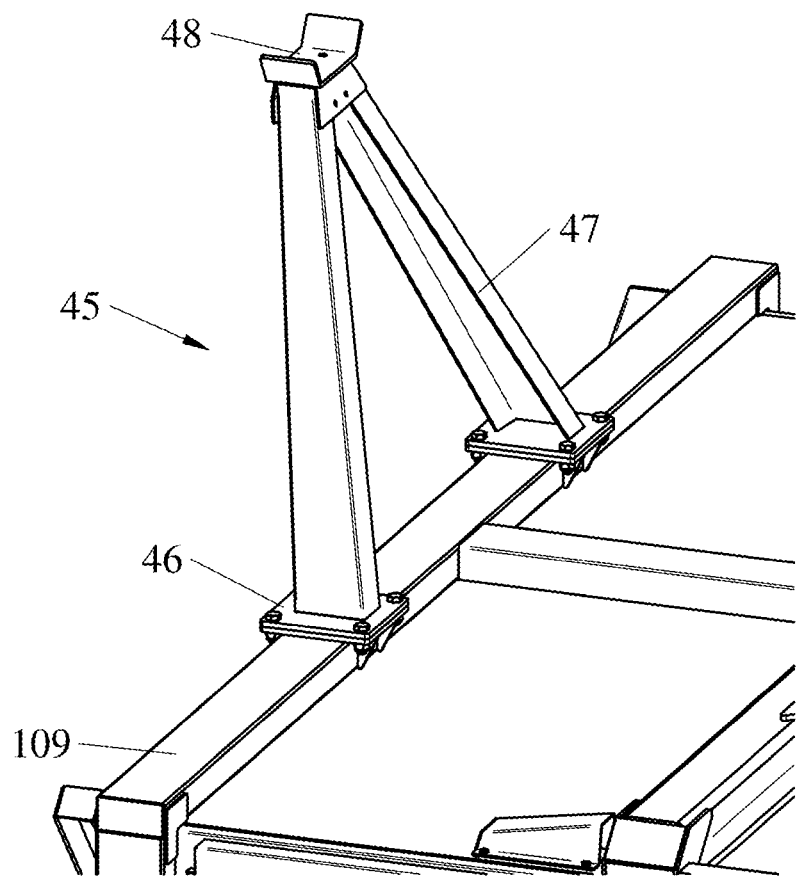
Figure 41:
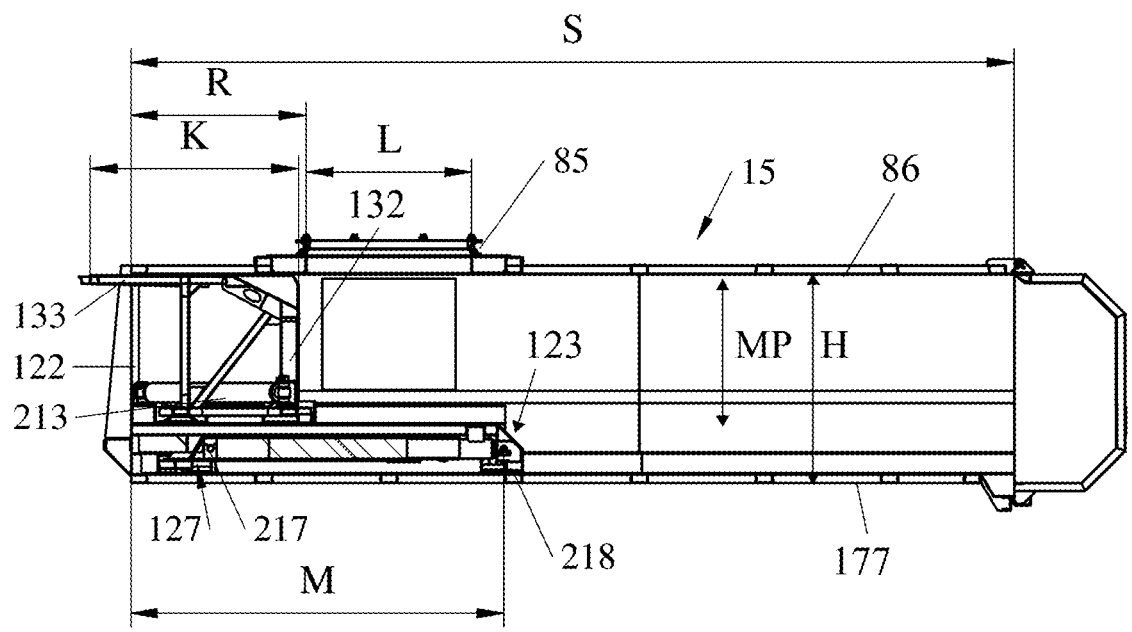
Figure 42:
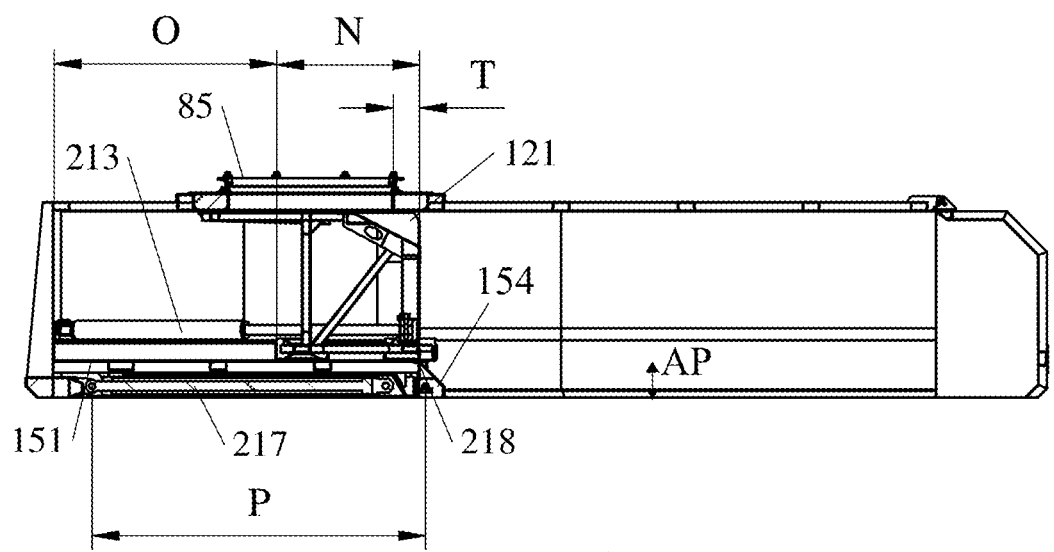

11D is an enlargement of Detail C of FIG. 11B, shown without the guide and the connection thereto;

11E is an enlargement of Detail C of FIG. 11B, shown without the slider and the connection thereto;

FIG. 12 is a top view of a lateral-position adjusting mechanism used in conjunction with the unloading system of FIG. 1;

FIG. 13 is a top view of FIG. 9, illustrating the chute while undergoing adjustment of its lateral position;

FIG. 14 is a side view of the unloading system of FIG. 1, when separated from the transport vehicle, illustrating the chute while undergoing adjustment of its vertical position and its longitudinal length;

FIG. 15 is a perspective view from the side of a main platen mount used in conjunction with the compacting system of FIG. 1;

FIG. 16 is a perspective view from the front of the main platen mount of FIG. 15;

FIG. 17 is a perspective view from the top of an auxiliary platen mount used in conjunction with the compacting system of FIG. 1;

FIGS. 18 and 19 are two different perspective views, respectively, from the bottom of the auxiliary platen mount of FIG. 17;

FIG. 20A is a perspective view from the front of a compaction chamber used in conjunction with the compaction system of FIG. 1, when separated from the transport vehicle and shown without components of the compaction system, according to one embodiment of the invention;

FIG. 20B is a perspective view from the top and side of the compaction chamber of FIG. 20A;

FIG. 20C is a perspective view from the front and side of a front portion of the compaction chamber of FIG. 20A;

FIG. 20D is an enlargement of Detail D of FIG. 20A;

FIG. 21 is a perspective view from the top and side of a piston holder used in conjunction with the compacting system of FIG. 1;

FIG. 22 is a side view of the piston holder of FIG. 21;

FIG. 23 is a perspective view from the top and rear of the piston holder of FIG. 21;

FIG. 24 is an enlargement of Detail E of FIG. 23;

FIG. 25 is a perspective view from the side of the rearward end of the floor of the compaction chamber of FIG. 9, showing a portion of the main platen and auxiliary platen after having been driven rearwardly following a discharging operation;

FIG. 26 is a front view of the compaction chamber of FIG. 20A when separated from the transport vehicle, illustrating a compacting system assembled therewithin;

FIG. 27 is a perspective view from the front of the compaction chamber of FIG. 20A when separated from the transport vehicle, illustrating two oblique hydraulic cylinders of the compacting system assembled therewithin;

FIGS. 28-35 illustrate the assembled compaction chamber of FIG. 26 in partial cutaway view during different stages of compacting and discharging operations to show the relative location of its components, FIGS. 28, 30, 32 and 34 being side views of the compaction chamber and FIGS. 29, 31, 33 and 35 being top views of the compaction chamber;

FIG. 36 is a perspective view from the side of a rear door member in a closed position, showing opening and closing apparatus therefor;

FIG. 37 is a side view of a portion of the apparatus of FIG. 36;

FIG. 38 is a side, partial cutaway view of an assembled compaction chamber, showing the apparatus of FIG. 36 while the rear door member is in an opened position;

FIG. 39 is a block diagram of a control system used in conjunction with the unloading system and compaction system of FIG. 1, according to one embodiment of the invention;

FIG. 40A is a perspective view from the front of a chute support for supporting the chute of FIG. 10 when in the starting horizontal position;

FIG. 40B is a perspective view from the top and side of the chute support of FIG. 40A when connected to a reinforcement beam at an upper region of the compaction chamber;

FIG. 41 is an enlargement of FIG. 28, showing various dimensional relations of the compacting system; and FIG. 42 is an enlargement of FIG. 30, showing various dimensional relations of the compacting system.

DETAILED DESCRIPTION OF THE INVENTION

The present invention is related to a safe vehicle-mounted system for unloading airplane-derived refuse despite the height above ground level of the access door from which the refuse is unloaded. The vehicle is also configured with a control system to prevent damage to the airplane when the unloading system is being positioned. An in-vehicle speedy and efficient compacting system to which the unloaded refuse is gravitationally delivered is also provided.

FIG. 1 illustrates a transport vehicle 12 which is provided with the apparatus of the present invention.

As shown, a compaction chamber 15, e.g. rectilinear, fixedly mounted on top of a platform 17 of transport vehicle 12 is adapted to receive the airplane-derived refuse that is gravitationally delivered thereto via funnel 9 operatively connected to compaction chamber 15. A schematically illustrated compacting system 20 is provided within compaction chamber 15, and serves to efficiently compact the introduced refuse after the refuse has been introduced into compaction chamber 15.

Safe unloading system 10 comprises chute 8 having an upwardly facing opening, e.g. a U-shaped profile, but which may be configured in other ways as well, in communication with the interior of funnel 9, and a safety gate 5 connected to the terminal end of chute 8. Chute 8 is able to be vertically displaced, linearly displaced, and laterally displaced in order to quickly direct safety gate 5 to the above-ground access door of the airplane. Safety gate 5 becomes automatically immobilized by an air brake system to prevent personnel from accidently falling through the access door.

Unloading system 10 and compacting system 20, whose operation may be synchronized, are configured to accommodate the size and dimensions of transport vehicle 12.

Unloading System

Figure 2:
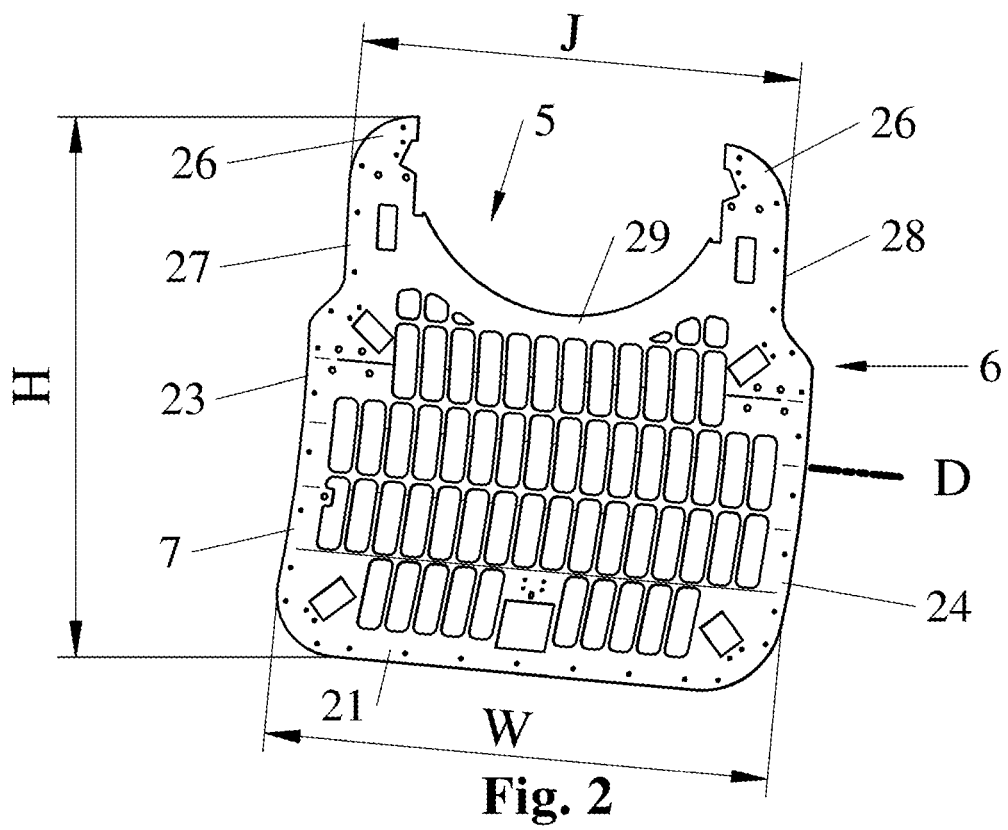
FIG. 2 is a front view of a safety gate used in conjunction with the unloading system of FIG. 1.

Reference is first made to FIG. 2, which illustrates a front view of safety gate 5. Safety gate 5 is shown to be of screenlike openwork construction with a plurality of adjacent bordered openings for weight savings and for preventing obstruction of the line of sight of the driver of transport vehicle 12 when chute 8 is lowered to a lowermost position substantially parallel to the ground surface whereby safety gate 5 is positioned in the line of sight of the driver, as shown in FIG. 1. Any structurally strong and impact resistant material such as steel is suitable for fabricating safety gate 5, for example 3-mm thick Hardox 450 having good bendability and weldability that are needed to produce the illustrated safety gate configuration. Safety gate 5 is configured with a relatively wide peripheral border element 6 that extends throughout its periphery. The peripheral border element 6 may be formed with a plurality of spaced apertures 7 for coupling with a single elastomeric peripheral covering 11 shown in FIG. 3 that prevents damage to the airplane body if inadvertently contacted by safety gate 5.

Safety gate 5 is of a universal construction that is able to be positioned in falling preventing relation with respect to the access door of most, or even of all, types of airplanes when taking into account the size of the access door and the curvature of the fuselage, and also conforms to security regulations for a continuous height of 1050 mm for fall arresting equipment above the airplane cabin floor.

Figure 3:
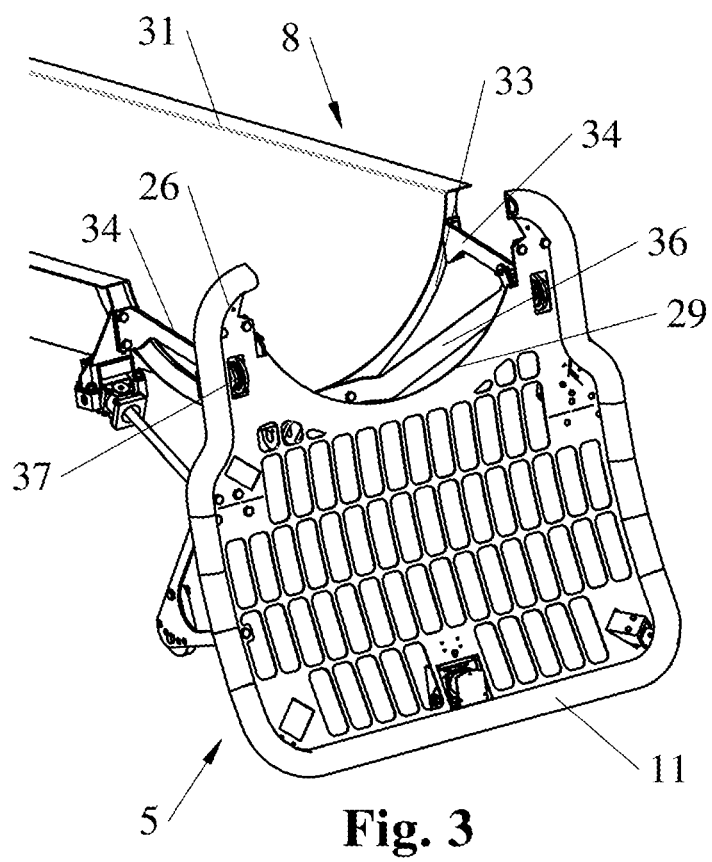
FIG. 3 is a perspective view from the front of the safety gate of FIG. 2, shown when disposed in a falling preventing orientation and connected to a chute.

In order to achieve the universal construction, the bottom border element 21 is adapted to be positioned at approximately the height of the airplane cabin floor. Opposed side border elements 23 and 24 with a width W therebetween greater than the width of all designed access doors extend upwardly from, and are substantially perpendicular to, bottom element 21. The regulation-conforming height H of safety gate 5 is defined by lower side border elements 23 and 24 and by upper side border elements 27 and 28 that are laterally spaced by a width J therebetween being narrower than dimension W in order to prevent interference with the upper hinges of the opened access door. A concave border element 29 positioned above and between lower side border elements 23 and 24 permits the passage of refuse elements over border element 29 and into chute 8 as shown in FIG. 3 without endangering the personnel handling the refuse elements. An interface element 26 having an inner vertically straight edge and an outer curved surface interfaces between an upper side border element and concave border element 29.

As shown in FIG. 4, safety gate 5 has a curved profile with an upper substantially vertical section 14 and a lower section 16 that downwardly and concavely curves from region D at the bottom of section 14, such that bottom border element 21 is more spaced from chute 8 than interface element 26 (FIG. 2) in order to accommodate the curvature of the airplane's fuselage. Region D corresponds to approximately three-quarters the height of lower side border elements 23 and 24 above bottom border element 21.

The connection between safety gate 5 and chute 8 ensuring that safety gate will always be positioned in falling preventing relation with respect to the access door despite a change in orientation of the chute is illustrated in FIGS. 3-5. "Falling preventing relation" or "falling preventing orientation" is defined herein as that orientation when upper section 14 of safety gate 5 is substantially vertically oriented, i.e. is angularly separated from the underlying horizontal ground surface by an angle ranging from 89 to 91 degrees, thereby ensuring that the entire height of the safety gate 5, including upper section 14 and lower section 16 thereof, is positioned sufficiently close to the entire peripheral border of the access door, i.e. by a spacing of no more than 10 cm, e.g. 5 cm, to prevent a person leaning out of the access door from falling.

Chute 8 is configured with a plurality of longitudinally spaced, arcuate reinforcements 33 (FIG. 5) fixedly connected to the outer surface of the concave chute. Each end of a reinforcement 33 may abut a corresponding rectangular lip 31 that slightly extends laterally outwardly from a corresponding lateral extremity of the concave chute and that may longitudinally extend throughout the length of the chute. A first support bar 34 is fixedly connected to a thin element 35 attached to the underside of lip closest to safety gate 5, and extends to a horizontal pivot 37, which is mounted on the rearward face, i.e. the chute-facing side, of interface element 26 (FIG. 3) of safety gate 5. A second support bar 36 connected to an intermediate portion of the corresponding first support bar 34 relatively close to safety gate 5 is fixedly connected to lug 39, e.g. rectangular, which is attached to the underside of a medial portion of chute 8.

As the two first support bars 34 are pivotally connected to safety gate 5, controlled movement of chute 8 causes safety gate 5 in turn to change its orientation. In order to ensure that safety gate 5 will always be positioned in falling preventing relation with respect to the access door, safety gate 5 is configured to be self-righting by virtue of one or more counterweights 42. Each counterweight 42 is connected to safety gate 5, for example to the border element of lower section 16, by means of two supports 44, causing the center of gravity of safety gate 5 to be shifted rearwardly.

Figure 6:
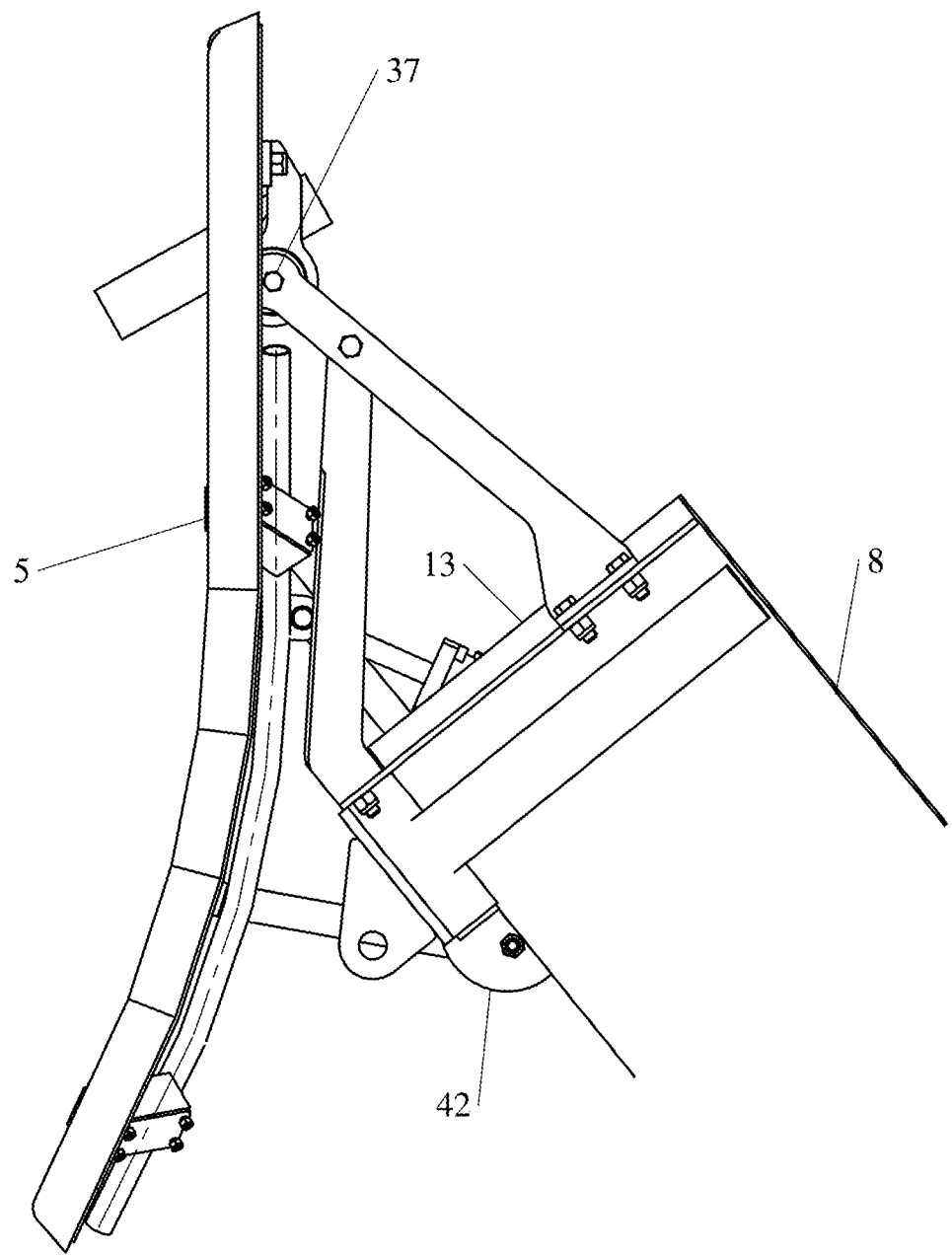
FIG. 6 is a side view of FIG. 3, shown when the chute is at an oblique orientation.

Thus when chute 8 is displaced from the horizontal orientation shown in FIGS. 1 and 4 to the orientation shown in FIG. 6 where its longitudinal axis is disposed at an angular orientation of approximately 45 degrees relative to a horizontal plane, while the chute terminal end 13 is located above its funnel-connecting end, an initial moment is applied that causes safety gate 5 to be rotated about the pivot axis coinciding with the two pivots 37 in a counterclockwise direction in accordance with the illustrated orientation. However, since counterweight 42 is located to the right of the pivot axis in accordance with the illustrated orientation, the distance between the counterweight and the pivot axis constitutes a righting arm which produces a moment that counterbalances the moment caused by the vertical displacement of chute 8 until safety gate 5 achieves the falling preventing orientation. The weight and relative location of counterweight 42 are selected to stably produce the suitable counterbalancing moment.

An air brake assembly 43 is mounted to the side of a reinforcement 33 which is closest to safety gate 5.

As shown in FIGS. 5 and 5A, air brake assembly 43 comprises air brake body 63, bar 41, lock cylinder 71, and trunnion block 65. Bar 41 is pivotally connected at a first end to safety gate 5, for example on the rearward face of an interface element of the safety gate, and is received within a bore of air brake body 63. When safety gate 5 is pivoted, bar 41 is axially displaced within the bore, as indicated by arrow 75.

The air brake body 63, which may be cylindrical, is mounted by trunnion pins 69 to trunnion block 65, the latter being pivotally connected to chute 8, Thus bar 41 is able to pivot relative to trunnion pins 69. Bar 41 is also received within the interior 73 of a pneumatically released, spring based lock cylinder 71, which is fitted in an intermediate region of air brake body 63. The maximum thickness of bar 41 is less than the radial dimension of the bore formed in air brake body 63 and of lock cylinder 71. Due to the radial clearance between bar 41 and the wall of the bore formed in air brake body 63, the bar is able to be radially displaced within the bore, as indicated by arrow 77. To effect the radial displacement, lock cylinder 71 is configured with a spring 74 which is positioned substantially perpendicularly to bar 41. Spring 74 is biased to push bar 41 to the wall of the bore and to apply a locking force that immobilizes safety gate 5 by preventing the bar from pivoting. Bar 41 is displaceable in an opposite radial direction by the schematically illustrated actuation means ACT, such as a pulse of air that is injected into air inlet 76 formed in lock cylinder 71, which is positioned at an opposite radial side of the bore to spring 74. Control module 284 (FIG. 39), after being signaled that safety gate 5 is to undergo vertical displacement, commands generation of a pulse of air that is injected into air inlet 76 and that helps to overcome the locking force applied by the internal spring, allowing the safety gate to be rotated about its pivot axis. Upon cessation of injection of air, bar 41 is once again secured by the internal spring 74 and safety gate 5 becomes immobilized. An exemplary air brake assembly may be manufactured by Aventics GmbH, Laatzen, Germany.

It will be appreciated that other spring-based mechanical brake devices for immobilizing the safety gate may be employed, in addition to pneumatic actuation for helping to overcome the locking force applied by the internal spring. Such actuation means ACT may include hydraulic actuation means, electric actuation means, magnetic actuation means, or a combination thereof, which are configured to act on bar 41 within the bore, such as via inlet 71 or in combination with control module 284. Any reference herein to an air brake assembly will be understood to be relevant as well to other types of mechanical brake assemblies, mutatis mutandis.

Reference will now be made to FIGS. 7-10, which illustrate the components for controllably displacing the chute. The drive components enable the chute to undergo the following three types of motion: (1) vertical motion by being pivoted about a horizontal axis, (2) linear motion by being extended or retracted, and (3) lateral motion by being pivoted about a vertical axis.

Figure 7:
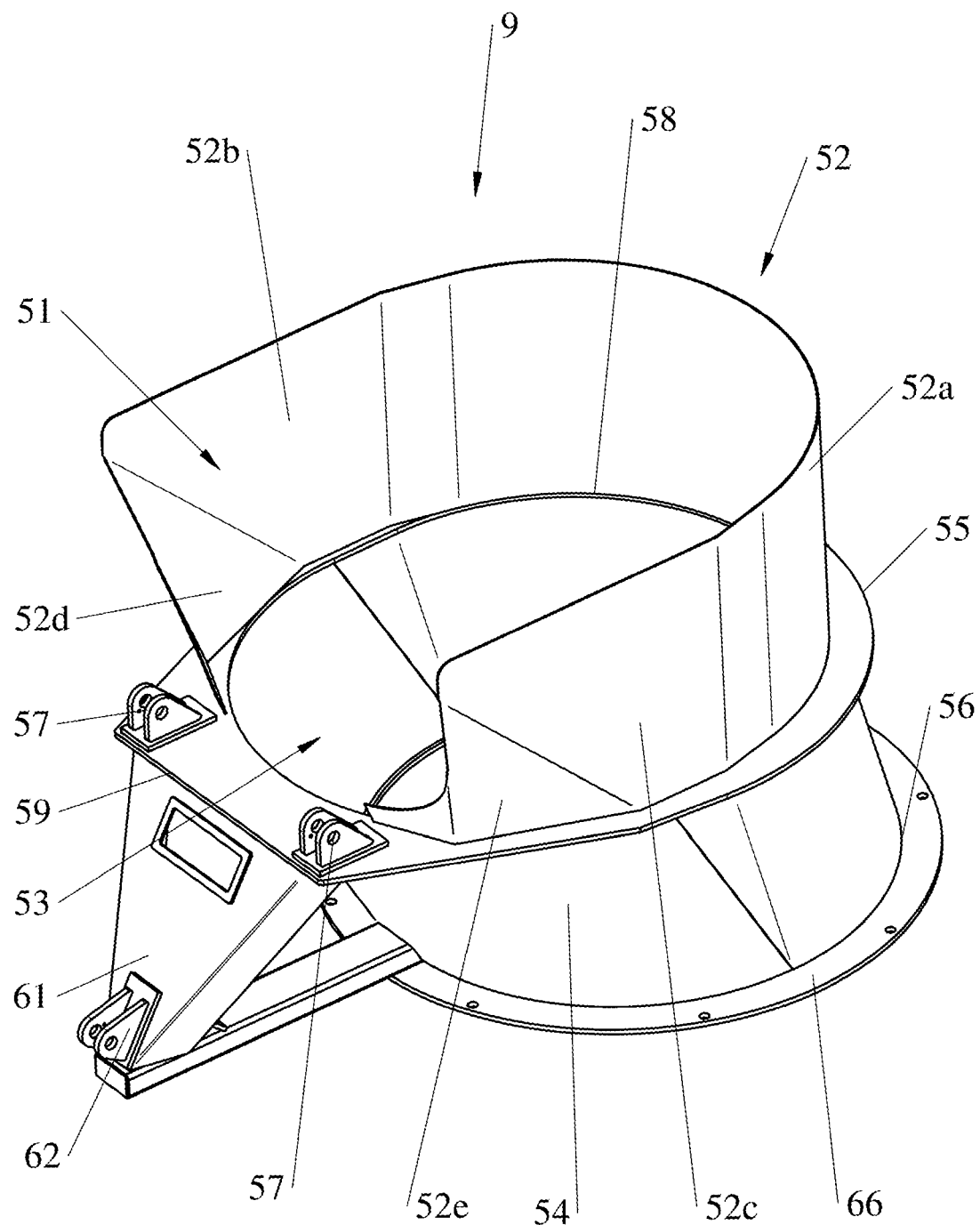
FIG. 7 is a perspective view from the top of a funnel used in conjunction with the unloading system of FIG. 1.

As shown in FIG. 7, funnel 9 is configured with an upper receiving compartment 51, a lower refuse transfer compartment 53, and a horizontal mounting plate 55 therebetween that surrounds the upper edge 58 of refuse transfer compartment 53.

Refuse transfer compartment 53 has a bottom circular edge 56, and a peripheral wall 54 that extends obliquely and upwardly at a predetermined slope to mounting plate 55 to define an upper oval edge 58. Upper receiving compartment 51 is defined by a vertical peripheral wall 52 that projects upwardly from mounting plate 55 in such a way to coincide with upper oval edge 58 at curved portion 52a thereof and to extend tangentially from upper edge 58 at two straight portions 52b and 52c thereof. Peripheral wall 52 also has two opposed guide portions 52d and 52e that are substantially perpendicular to straight portions 52b and 52c, respectively, and that extend only a fraction of the width between the two straight portions 52b and 52c.

Two pairs of vertical apertured supports 57, within which a pivot pin connected to the chute is rotatably mounted, extend upwardly from mounting plate 55, located between a corresponding guide portion and the chute-facing edge 59 of mounting plate 55. A reinforced sloped brace 61 extends downwardly from chute-facing edge 59, and a pair of apertured supports 62 for pivotal connection with a vertical-position adjusting piston project from the bottom of sloped brace 61.

An annular rim 66 extends outwardly from bottom circular edge 56 of refuse transfer compartment 53. Annular rim 66 is connected to an annular rim 68 extending outwardly from the outer surface of the bearing 67 shown in FIG. 8 to facilitate rotary motion of funnel 9 about a vertical axis, resulting in lateral chute displacement. Bearing 67 is fitted within the upper horizontal roof 82 of compaction chamber 15, around a circular wall 84 delimiting an opening 85 through which the transferred refuse is introduced into the interior of the compaction chamber. Opening 85 is located at approximately one-quarter length of compaction chamber 15, closer to forward edge 122 (FIG. 9).

FIG. 9 illustrates many of the drive components for the unloading system. The chute is configured with outer section 8A and inner section 8B in order to facilitate an extension or retraction operation, according to one embodiment of the invention.

The cylinder of vertical-position adjusting piston 72 is pivotally connected to supports 62 at the bottom of sloped funnel brace 61 and its rod is pivotally connected to lug 92 connected to outer section 8A. The cylinder of length-adjusting piston 89 is connected to lug 92 and its rod is connected to lug 39 of inner section 8B. A lateral-position adjusting mechanism 105 is connected to an upper region of compaction chamber 15 and to a region of funnel 9.

As shown in more detail in FIG. 10, pin supports 81 are located at an intermediate region, e.g. at approximately one-quarter of the longitudinal length of outer chute section 8A, as measured from the funnel-facing end 83 thereof. Since vertical-position adjusting piston 72 (FIG. 9) is connected to sloped funnel brace 61 and is therefore oblique to outer chute section 8A at pin supports 81, the extension or retraction of the rod of piston 72 by a minimally applied force transmits a relatively large moment to the chute, to cause pivotal displacement of the chute and a change in vertical position of the safety gate.

Pivotal displacement of the chute is made possible by a lug 88, e.g. concave, that is attached to outer chute section 8A proximate to funnel-facing end 83 and that has two spaced protruding aperture pin supports 78. Each pin support 78 is adapted for insertion between a corresponding pair of funnel-mounted apertured supports 57 (FIG. 7), to facilitate pivotal displacement of the chute about the horizontal axis defined by a pin inserted within the aligned apertures of supports 57 and 78 in response to extension or retraction of the rod of vertical-position adjusting piston 72.

The cylinder of length-adjusting piston 89 is connected to the pair of supports 87. Supports 87 may be positioned at one end of lug 92 which is connected to pin supports 81, or alternatively may be spaced from supports 87 such that supports 81 and 87 protrude directly from the outer convex surface of outer chute section 8A. The rod of length-adjusting piston 89 is connected to spaced supports 94 protruding from lug 39, which is connected to the underside of inner chute section 8B, as shown in FIG. 10A.

As shown in FIGS. 11A-E, outer chute section 8A is configured with a guide 96 having one or more U-shaped cross sections. Guide 96, which may longitudinally extend throughout the length of outer chute section 8A, may have a first rectangular surface 97 and, a second rectangular surface 98 substantially parallel to first surface 97, and a surface 99 that interconnects, and is substantially perpendicular to, surfaces 97 and 98. Each guide 96 may be formed integrally with outer chute section 8A, or may be connected thereto.

Inner chute section 8B, which is partially illustrated in FIG. 11A for clarity, is configured with two opposed longitudinally extending lips 31, e.g. rectangular, each of which is adapted to be received in a corresponding guide 96. The underside of each thin lip 31 is reinforced at various regions thereof, e.g. four regions, by a corresponding reinforcing element 95, which is secured by one or more inclined braces 91 connected to the refuse-contactable surface of inner chute section 8B and which is generally parallel to surfaces 97 and 98. When the rod of length-adjusting piston 89 is extended or retracted, inner chute section 8B is correspondingly increasingly extended or retracted in response, while the linear displacement of the inner chute section is urged by the cooperation between each lip 31 and the corresponding guide 96. One or more sliders 102 may be fixed to each lip 31 and received in guide 96 in order to reduce friction during linear displacement of inner chute section 8B. For example, as shown in FIG. 11D, a first slider 102a is attached to lip 31 and a second slider 102b is attached to reinforcing element 95 located below lip 31.

Lateral-position adjusting mechanism 105 for laterally displacing the chute is illustrated in FIG. 12. Mechanism 105 comprises lateral-position adjusting piston 101, straight link 104 and arcuate link 107. An oblique beam 112 fixed at angle with respect to parallel reinforcement beams 109 at the upper region of compaction chamber 15 is used to support mechanism 105.

One end of arcuate link 107 is pivotally connected to triangular appendage 106, which in turn is fixedly connected to the annular funnel rim 66. For example, arcuate link 107 is pivotally connected to the apex of triangular appendage 106 that is attached to rim 66. The second end of arcuate link 107 is pivotally connected together with a first end of straight link 104 and with the terminal end of the rod of lateral-position adjusting piston 101 by pin 114. The second end of straight link 104 is pivotally connected to a pair of vertically spaced pin supports 116 that are fixedly connected to oblique beam 112. The cylinder of lateral-position adjusting piston 101 is pivotally connected to a region of oblique beam 112 that is more spaced from funnel 9 than supports 116.

The use of arcuate link 107 significantly increases the magnitude of the moment that is able to be transmitted to annular rim 66 at the beginning and end of the stroke of lateral-position adjusting piston 101, even though the moment generated by a piston rod is relatively weak at the beginning and end of its stroke. Thus funnel 9 is able to be rotated at a substantially uniform and optimal speed in each rotational direction in order to adjust the lateral position of the chute.

FIG. 13 illustrates chute 8 while undergoing adjustment of its lateral position, for example a total angular displacement of 90 degrees about a vertical axis, i.e. 45 degrees from the starting position, following activation of the lateral-position adjusting mechanism.

FIG. 14 illustrates chute 8 while undergoing adjustment of its vertical position, for example an angular displacement of 52 degrees with respect to a starting substantially horizontal position, following activation of the vertical-position adjusting piston. Safety gate 5 is shown to remain in falling preventing relation despite the angular displacement of chute 8 about a horizontal axis, while the funnel-facing end of chute 8 is introduced within the interior of upper receiving compartment 51 of funnel 9 in order to effectively transfer the airplane-derived refuse to compaction chamber 15.

Chute 8 is also illustrated while undergoing extension and retraction, following activation of the length-adjusting piston.

Chute 8, when in the starting horizontal position, is supported by one or more supports 45 illustrated in FIGS. 9 and 40A-B. A chute support 45 comprises two horizontal connecting plates 46 that are connected from above to an upper reinforcement beam 109 of the compaction chamber, two converging braces 47 that obliquely extend upwardly from a corresponding plate 46, and a side-stop 48 attached to the upper junction of the two braces 47. A side-stop 48, which may be positioned above the lateral centerline of the compaction chamber, is configured with a central rectangular and horizontal element 38 and with two oblique side wings 49 for abutment with a portion of the chute. A chute portion may rest on side-stop 48.

Compacting System

Prior art compacting systems comprising a top and continuously loaded compaction chamber suffer from the risk that refuse continues to be introduced via an upper opening into the compaction chamber while the vertical platen has been displaced rearwardly to participate in a compacting operation and therefore cannot be compacted even after the platen has been returned to its starting position. Another disadvantage of prior art compacting systems is that they employ one or more hydraulic rams of a sufficiently long length that enable the platen to compress the introduced refuse when the platen is displaced to a first distance and to discharge the compressed refuse from the compaction chamber when the platen is displaced to a second distance and a rear door member is opened; however, due to its long length, the ram has to be positioned such that it protrudes forwardly from the compaction chamber in anticipation of a subsequent compaction operation while it conveys refuse-derived liquids that it has contacted during the compaction operation outwardly from the compaction chamber, unnecessarily soiling the exterior of the service vehicle to such a degree that it often is unable to be satisfactorily cleaned. Also, an exorbitant amount of hydraulic fluid needs to be employed in order to actuate the hydraulic ram during a compacting operation, a larger oil flow and tank capacity are needed, and time consuming maintenance operations are required, due to the long length of the hydraulic ram.

These disadvantages are obviated by the compacting system of the present invention, which comprises a main platen mount, an auxiliary platen mount adapted to movably support the main platen mount thereunder, and a piston holder movably positioned underneath the auxiliary platen mount for increasing the linear displacement of the main platen mount. The main platen mount is therefore able to be linearly displaced a first distance relative to the auxiliary platen mount in order to perform a compacting operation, and is able to be subsequently linearly displaced a second distance by means of the piston holder, together with the auxiliary platen mount, using short-stroke pistons.

The main platen mount has a surface which occludes, when the main platen mount is rearwardly displaced in order to perform a compaction operation, the upper opening through which refuse is normally introduced into the compaction chamber. Thus introduction of refuse into the compaction chamber forwardly of the main platen is restricted, while the introduced refuse is able to be directed into the large interior of the compaction chamber rearwardly of the upper opening.

In this fashion, the occluding surface of the main platen mount can have a length of only 15-20% the length of the entire compaction chamber and be positioned completely forwardly of an unobstructed upper opening while refuse is being introduced to provide a compaction chamber having a sufficiently large interior to hold the refuse derived from approximately 100 airplanes, yet the short-stroke pistons of the main platen mount are able to generate a sufficiently large compaction force together with those of the auxiliary platen mount.

Although the compacting system is described in conjunction with the unloading system for airplane-derived refuse, it will be appreciated that the compacting system is also applicable for any other top loaded compaction chamber.

Reference is first made to FIG. 9, which illustrates compacting system 20 according to one embodiment of the present invention, shown in a starting position whereby main platen mount 121, auxiliary platen mount 123 and piston holder 127 are all disposed relatively close to forward edge 122 of compaction chamber 15 and rear door member 220 is in a closed position, with a portion of main platen mount 121 protruding forwardly from the rectilinear compaction chamber 15. At this starting position, funnel 9 is not occluded and the airplane-derived refuse is allowed to be introduced into the interior of compaction chamber 15.

Compaction chamber 15 may be also configured with an opening 119, also shown in FIG. 8, formed in an intermediate region of side wall 18 thereof. Opening 119 accommodates the introduction from the side of refuse into compaction chamber 15, for example derived from light aircraft whose access door may be located at a height below that of roof 82 of compaction chamber 15. Refuse introduced through side opening 119 is directed rearwardly of the main platen when the latter is disposed at a forwardmost position.

Compaction chamber 15 has a uniform rectilinear cross section from forward edge 122 to rear post 129 (FIG. 36), excluding openings 85 and 119, to facilitate a cost effective manufacturing procedure. Compaction chamber 15 has a limited height to avoid interference between funnel 9 and the wings of an airplane when the compaction chamber is being transported by transport vehicle 12 (FIG. 1). By virtue of its unique configuration, as will be described hereinafter, the compacting system has an advantageously low weight while being able to receive and compress a large volume of refuse, so that transport vehicle 12 supporting the compaction system is also to be of a cost effective low weight, for example a 15-ton transport vehicle requiring only a forward set 2 and a rear set 3 of tires.

Although the following description relates to a circular upper opening 85, configured to cooperate with funnel 9, other embodiments of the compacting system are envisioned that provide a differently shaped upper opening, such as a rectangular upper opening.

Main platen mount 121 is illustrated in FIGS. 15 and 16, and comprises a substantially vertical main platen 132 and a substantially horizontal occluding surface 133 that is rigid and non-yielding. Main platen 132 downwardly extends from the rear edge of occluding surface 133 to auxiliary platen mount 123 (FIG. 17). Occluding surface 133 is shown to be trapezoidal for weight savings, with the short edge 134 thereof distant from main platen 132, but may assume any other desired shape.

The forward region of main platen mount 121 is open to accommodate the movement of two oblique hydraulic cylinders, as will be described hereinafter. Even though occluding surface 133 forwardly projects from main platen 132, occluding surface 133 is supported by a plurality of lower beams 136*a-d*, and a plurality of columns 137 and braces 138, each of which connected at a first end to a beam or to an appendage connected thereto and connected at a second end to the underside of occluding surface 133 or another support element connected thereto. The two laterally extending beams 136*b* and 136*d* define the lengthwise dimension of the support members of main platen mount 121. Two outwardly open, rectilinear linear bearing holders 142 are connected to, and extend downwardly from, each of lengthwise extending beams 136*a* and 136*c*, so that a linear sliding bearing, e.g. made of Nylatron®, when held thereby will be horizontally oriented.

An upwardly open channel 149, e.g. having a C-shaped cross section, may be attached to peripheral edges of occluding surface 133. As shown, channel 149 is attached to the short forward edge 134 of occluding surface 133 and to a forward region of side edges 135*a-b* thereof, such that the channel is continuous. The upper edge of channel 149 is positioned below occluding surface 133, so that refuse-derived liquids contacted by main platen 132 during a compaction operation and sprayed or otherwise transferred to occluding surface 133 will be received within channel 149 to prevent the soiling of the transport vehicle or its surroundings by the liquid. The compaction chamber may be disposed at a slight incline, e.g. of 1-2 degrees, such that the rearward end of the compaction chamber is below its forward end to allow the received liquids to be gravitationally discharged from channel 149 onto the bottom surface of the compaction chamber. Channel 149 may be disposed at a greater incline than the compaction chamber, such as an additional 5-6 degrees with respect to the bottom surface of the compaction chamber, i.e. 7-8 degrees.

Occluding surface 133 may be configured with a ramped and recessed surface 139, which is shown to be rectangular but may assume other shapes as well. Ramped surface 139 may coincide with a widthwise centerline of occluding surface 133, and extend rearwardly from a central region of occluding surface 133 to main platen 132 at an angle of approximately 45 degrees, for example ranging from 30-60 degrees. An opening defined by ramped surface 139 prevents deformation of the roof of the compaction chamber when refuse becomes clogged between the main platen mount and the roof.

Two spaced, vertically oriented pivot mounts 146 for pivotal connection to a corresponding obliquely disposed hydraulic cylinder are centrally attached to beam 136*d*, for example below ramped surface 139.

Auxiliary platen mount 123 is illustrated in FIGS. 17-19. Auxiliary platen mount 123 comprises a horizontally disposed refuse-receiving surface 151, e.g. rectangular, on which the airplane-derived refuse falls after passing through the funnel. The obliquely disposed auxiliary platen 154 extends between the similarly shaped side of two trapezoidal, vertically oriented fixtures 156 which are connected to, and extend downwardly from, the rearward end of refuse-receiving surface 151.

Refuse-receiving surface 151 may be configured with two laterally spaced drainage openings 152 that are formed at a central and laterally outward region thereof. Refuse-derived liquids discharged from channel 149 (FIG. 15) may be received by drainage openings 152 and then delivered rearwardly onto the compaction chamber floor 177 (FIG. 20A) by corresponding sloped surfaces 179 attached to the underside of refuse-receiving surface 151.

Two opposed, lengthwise extending guide rails 153, i.e. parallel to the compaction chamber side wall, within which the linear sliding bearings of the main platen mount are receivable to allow displacement of the main platen mount relative to auxiliary platen mount 123, are connected to the lateral sides of refuse-receiving surface 151 and protrude vertically thereabove. An abutment 157 is connected to the forward side of refuse-receiving surface 151 and protrudes vertically thereabove. An angled bracket 158, to which is affixed a corresponding pivot mount 159, is attached to the upper surface of each guide rail 153 at the forward end thereof and to the adjacent upper surface of abutment 157. The two angled brackets 158 are rearwardly open, to accommodate the movement of an oblique hydraulic cylinder connected at one end to a corresponding pivot mount 159 and at a second end to a corresponding pivot mount 146 of the main platen mount (FIG. 16).

Two retractable eyelet protectors 163 are fitted in auxiliary platen 154, below refuse-receiving surface 151. An eyelet adapted for connection to a piston rod positioned parallel to guide rail 153 is exposed upon retraction of a protector 163.

A leg 161 attached to a bottom surface of a corresponding guide rail 153, at a forward portion thereof, extends downwardly from the guide rail. Leg 161 may have a triangular cross section, to allow a portion of the leg to be additionally attached to one of the reinforcement elements 164 secured to the underside of refuse-receiving surface 151. A linear bearing holder 162 is attached to the laterally outward surface of each of fixture 156 and leg 161, which are coplanar, so that a linear sliding bearing secured to each bearing holder 162 will be slidingly displaceable along a corresponding guide rail 173, which is fixed to the bottom of a side wall 176 of compaction chamber 15 and in contact with compaction chamber floor 177, as shown in FIG. 20A, to enable lengthwise displacement of the auxiliary platen mount.

A lengthwise extending, rectilinear coupler 167 configured with a lower lengthwise extending slit is secured to a central region of the underside of refuse-receiving surface 151, and may pass through reinforcement elements 164 which are substantially perpendicular thereto. Coupler 167 is used for engagement with the piston holder 127 (FIG. 21).

A planar strengthening appendage 174 with a laterally outwardly extending lip 178 may be attached to the side wall of a corresponding guide rail 153 of auxiliary platen mount 123. Lip 178 minimizes the ingress to the hydraulic cylinders of any gravitating refuse-derived liquids and of any refuse-derived small solids. Elongated fixture 171 (FIG. 20A), which is attached to side wall 176 of compaction chamber 15 above guide rail 173, serves as additional means for protecting the hydraulic cylinders from any gravitating refuse-derived liquids.

Piston holder 127 is illustrated in FIGS. 21-24.

Piston holder 127 has a forwardly positioned, laterally extending beam 182, which is equipped at each end with a linear bearing holder 184, so that a linear sliding bearing secured thereto will be slidingly displaceable along a corresponding guide rail 173 (FIG. 20A), to enable lengthwise displacement of the piston holder. An elongated and vertically oriented support member 187 is connected by means of centrally located pedestal 183 and overlying extender 185 to, and extends lengthwise along a line substantially coinciding with the centerline of, beam 182. Two lengthwise separated eyelets 188, which may be through holes, for facilitating connection with a corresponding parallel-positioned hydraulic cylinder, are formed near a corresponding lengthwise, triangularly shaped end 194 of support member 187, to accommodate opposite orientation of the two parallel-positioned hydraulic cylinders. An arcuate cylinder retainer 189 with a horizontal lengthwise axis may be fixed to support member 187 at a location that is slightly spaced from a corresponding eyelet 188 to limit movement of a cylinder. A horizontal plate 193 is connected to one or more braces, for example to oblique brace 196 extending between beam 182 and support member 187 at a corresponding side thereof, to guard and protect tubes, hoses and other ancillary equipment associated with a parallel-positioned hydraulic cylinder from gravitating refuse.

A horizontally disposed, twin linear bearing holder unit 191, which is provided with two bearing holders 198 in side by side relation, is secured to the rearward end 194 of support member 187, so as to be vertically spaced above the upper surface of support member 187, for example by a distance of approximately 10 cm. A vertical divider 192 separating the two bearing holders 198 extends downwardly and is secured by an obliquely disposed thickened portion 197 to a side wall 195 of rearward end 194, without interfering with eyelet 188 formed therethrough. In this fashion, twin linear bearing holder unit 191 is insertable within, and slidable along, coupler 167 of auxiliary platen mount 123 (FIG. 19), after a bearing is secured to each holder, while divider 192 extends through the lower slit of coupler 167.

Support member 187 is located at a height above beam 182 to provide a small clearance of at least 7 cm, e.g. 7-15 cm, between the compaction chamber floor and support member 187 for cleaning purposes. The tapered configuration of piston holder 127 by which the width between opposed braces 196 is progressively decreased in a rearward direction and the lengthwise ends 194 of support member 187 are triangularly shaped such that a bottom surface thereof is longer than an upper surface thereof facilitate manipulation of a cleaning implement through and to the sides of piston holder 127, in such a way that refuse is able to be completely cleared from the compaction chamber floor, a condition that heretofore was infeasible due to the wide and untapered configuration of the compacting system, and particularly of the prior art platen mount.

Another means for facilitating removal of refuse from the compaction chamber is illustrated in FIGS. 20B, 25 and 38. The rearward end of compaction chamber floor 177 is configured with a rearwardly sloped portion 203, along which incompressible pieces of refuse are dischargeable following a compacting operation, and with a horizontal portion 204 extending rearwardly from sloped portion 203 and recessed from floor 177. During the end of a discharging operation when main platen 132 and auxiliary platen 154 are driven in unison towards a rearwardly pivotable door member to displace the compressed refuse, a surface 246 of the door member, which may be a sealing element, is in abutting relation with horizontal portion 204. Solid pieces of refuse, e.g. hard pieces, which were trapped forwardly of the forwardmost position of main platen 132 and were displaced rearwardly along floor 177 by a manual cleaning implement, are thus able to fall to, and be collected within, horizontal portion 204 located therebelow and be subsequently discharged from the compaction chamber.

An assembled compacting system 20 is illustrated in FIG. 26. Laterally extending beam 182 of the piston holder, after a sliding bearing 201 aligned therewith is received in a corresponding guide rail 173 attached to a compaction chamber side wall and twin linear bearing holder unit 191 is received in coupler 167 of the auxiliary platen mount, is shown to be located slightly above compaction chamber floor 177. When sliding bearing 206 of the main platen mount which is secured to holder 142 is received in a corresponding guide rail 153 of the auxiliary platen mount, forward abutment 157 of the auxiliary platen mount is below and in close proximity to beam 136b of the main platen mount and occluding surface 133 of the main platen mount is located slightly below, e.g. 3 cm below, the lower surface 86 of the upper plate 82 of compaction chamber 15. Thus the main platen mount is able to be displaced without interference with the compaction chamber, while maximizing the available volume within the compaction chamber for receiving and compacting refuse. Likewise the main platen mount is able to be displaced relative to the auxiliary platen mount, the auxiliary platen mount is able to be displaced relative to the piston holder, and the piston holder is able to be displaced relative to the compaction chamber.

With reference also to FIG. 27, an oblique hydraulic cylinder 213 is pivotally attached at its first end to a corresponding pivot mount 159 provided with an auxiliary platen mount bracket 158 (FIGS. 17 and 26) and the piston rod at its second end to a corresponding pivot mount 146 (FIG. 16) provided with the main platen mount, passing through an opening defined between a centrally located column 137 and an oblique brace 138 which is longitudinally spaced from the corresponding column 137. By virtue of the oblique disposition of cylinder 213, the compacting force applied thereby may be considerably greater than that of the prior art, particularly at the end of the stroke, even though the longitudinal length of the cylinder is smaller, to ensure that a hydraulic cylinder applying the compacting force will not have to protrude from the compacting chamber and carry with it refuse-derived liquids and solids that exit the compaction chamber through the opening through which the prior art cylinder protrudes.

A first parallel-positioned hydraulic cylinder 217 is connected to the piston holder and its piston rod to the compaction chamber, and a second parallel-positioned hydraulic cylinder 218 is connected to the piston holder and its piston rod is connected to an eyelet of the auxiliary platen mount located underneath the refuse-receiving surface.

As shown in FIGS. 20C-D, one end of the first parallel-positioned hydraulic cylinder is connected to a pair of eyelets formed in two laterally spaced, vertically oriented plates 221, which slightly extend rearwardly from a central support member 224 secured to the bottom of compaction chamber 15 at the forward edge 122 thereof. Braces 227 and 228 extend obliquely from corresponding lateral ends of support member 224 to a corresponding upper corner 229 of compaction chamber 15 at the forward edge 122 thereof, to provide a sufficiently large opening between the two braces for the passage therethrough of occluding surface 133 of the main platen mount (FIG. 15).

The apparatus for opening and closing rear door member 220 will now be described with reference to FIGS. 36-38.

Three-dimensional door member 220 is configured with two polygonal, or any other shaped, side walls 223 bounded by a straight forwardly positioned structural member 222. A plurality of enclosing elements 226 extend between the two side walls 223 to define the interior of door member 220.

The upper end of each of the two opposed and outwardly positioned rear posts 129 of the compaction chamber, which is substantially parallel to door member structural member 222 when door member 220 is closed, is configured with a pair of eyelets formed in two laterally spaced, triangularly shaped and vertically oriented plates 232, for the pivotal connection thereto of a corresponding cylinder 237. Near the bottom of the rearward face of post 129 is formed an elongated aperture 236, and a fixture 238 connected to post 129 and substantially perpendicular thereto extends rearwardly from a region corresponding to approximately a centerline of aperture 236.

The upper end of door member 220 is pivotally connected to an upper rear structural member of the compaction chamber, to facilitate pivotal displacement about a horizontal axis.

A pair of parallel and short attachment plates 241 are pivotally connected at one end to the piston rod 239 of cylinder 237 by pivot point 242 and fixedly connected at the other end to the elongated bar 243 of a hook element 244. Hook element 244 has an arcuate tip 248, indicated by dashed lines as it is hidden in the view of FIGS. 36 and 37, and a pointed protrusion 249 substantially parallel to the centerline of bar 243 that slightly protrudes from attachment plates 241 into the interior defined by the rounded inner surface of tip 248. The terminal end of bar 243 is pivotally connected to a pivot point 247 positioned at a central region of structural member 222 of door member 220.

When door member 220 is in a closed position, as shown in FIGS. 36 and 37, piston rod 239 of cylinder 237 is retracted and the rounded tip 248 of hook element 244, which is hidden and schematically indicated by dashed lines, is caused to be received in aperture 236 from below fixture 238 and to then be curved above the fixture, while pointed protrusion 249 securely engages the bottom of fixture 238 to maintain door member structural member 222 in a substantially parallel relation to rear posts 129 of the compaction chamber.

As a result of the pivotal connection of hook element 244 to door member structural member 222 and of the pivotal connection of piston rod 239 to the attachment plates 241 which are connected to hook element bar 243, the controlled extension of piston rod 239 causes counterclockwise rotation of hook element 244 with respect to the orientation illustrated in FIG. 37 so that it will become released from rear post 129. Complete extension of piston rod 239 causes door member 220 to become pivoted approximately 90 degrees to a fully opened position illustrated in FIG. 38, allowing the compressed refuse received in the interior of the door member to gravitate downwardly therefrom to a waste disposal site.

FIGS. 28-35 illustrate different stages of compacting and discharging operations. The first and second stages are performed during unloading of the refuse, for example airplane-derived refuse when the compaction chamber is secured to a transport vehicle, in order to introduce the refuse into the upper opening. The third and fourth stages are performed at a waste disposal site prior to discharging the refuse outwardly from the compaction chamber.

Two symmetrically disposed oblique hydraulic cylinders 213 are adapted to displace main platen mount 121 relative to auxiliary platen mount 123 when parallel-positioned hydraulic cylinders 217 and 218 are stationary and provide the required reactive force. Parallel-positioned hydraulic cylinder 218 is adapted to displace auxiliary platen mount 123 relative to piston holder 127 when parallel-positioned hydraulic cylinder 217 is stationary and provides the required reactive force. Parallel-positioned hydraulic cylinder 217 is adapted to displace piston holder 127 relative to compaction chamber 15.

In the first stage illustrated in FIGS. 28 and 29, the piston rod of cylinders 213, 217 and 218 are retracted to provide a reactive force, and main platen mount 121, auxiliary platen mount 123, and piston holder 127 are all located at their forwardmost position. At this forwardmost position, main platen mount 121 is located completely forwardly to refuse-introducible opening 85, while short forward edge 134 of its occluding surface is located forwardly to forward edge 122 of compaction chamber 15. Thus refuse introduced through opening 85 will gravitate onto the refuse-receiving surface of auxiliary platen mount 123, and is prevented by the main platen from being introduced forwardly to opening 85. Eventually, additionally introduced refuse falls to compaction chamber floor 177 rearwardly to auxiliary platen mount 123.

In the second stage illustrated in FIGS. 30 and 31, each piston rod of oblique hydraulic cylinders 213 is extended, resulting in angular displacement of the cylinders, to cause rearward displacement of main platen mount 121 while auxiliary platen mount 123 remains at the forwardmost position. In this position, the main platen and the auxiliary platen are substantially aligned. Refuse located on the refuse-receiving surface of auxiliary platen mount 123 will therefore be deflected rearwardly by the main platen onto compaction chamber floor 177 and compressed to a certain degree. The occluding surface of main platen mount 121 accordingly prevents additional refuse to be introduced into the compaction chamber. The auxiliary platen prevents the deflected refuse from returning forwardly.

These first and second stages may be performed cyclically, whether periodically or intermittently, in order to rearwardly deflect the introduced refuse and to vacate room for additional refuse to be introduced, while compressing the previously deflected refuse. The compressed refuse is eventually received within the interior of the closed door member 220. The number of cycles during performance of the first and second stages may range from 1-1000 continuous cycles, depending on the discretion of the operator, e.g. 3 or 5 cycles, for example during periods of reduced supply of refuse.

As will be described hereinafter, control system 270 (FIG. 39) disables operation of parallel-positioned hydraulic cylinders 217 and 218 during the first and second stages when door member 220 is closed, to prevent introduction of refuse forwardly to main platen mount 121.

Figure 33:
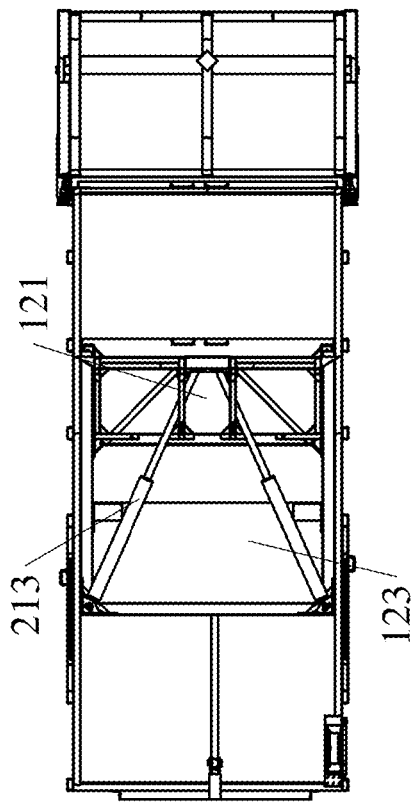
Figure 32:
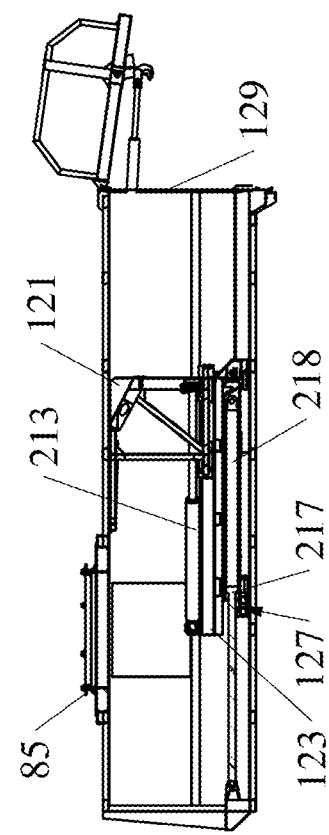

In the third stage illustrated in FIGS. 32 and 33, door member 220 is set to an opened position, to enable operation of parallel-positioned hydraulic cylinders 217 and 218. While door member 220 is opened, the refuse that has been received therewithin during each cycle of the second stage gravitates onto a region of the waste disposal site. The piston rod of parallel-positioned hydraulic cylinder 217 is thus allowed to be extended while the piston rod of parallel-positioned hydraulic cylinder 218 remains retracted. Main platen mount 121, auxiliary platen mount 123, and piston holder 127 are therefore displaced rearwardly in unison by a stroke equal to the length of the piston rod of parallel-positioned hydraulic cylinder 217. Refuse is accordingly displaced rearwardly by the combined effort of the main platen and the auxiliary platen.

Figure 35:
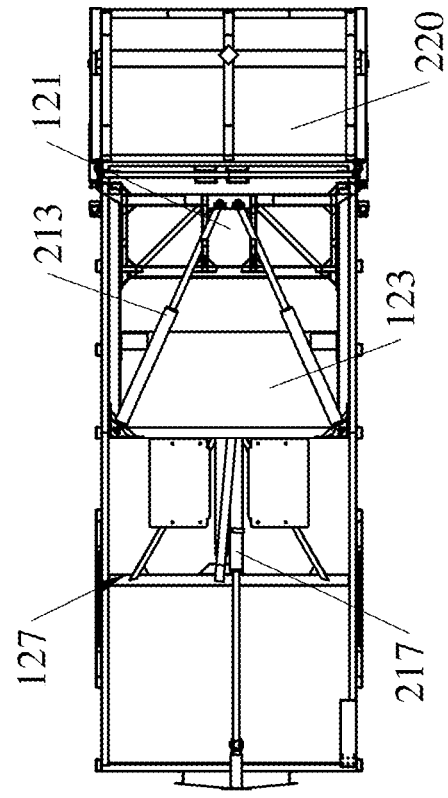
Figure 34:
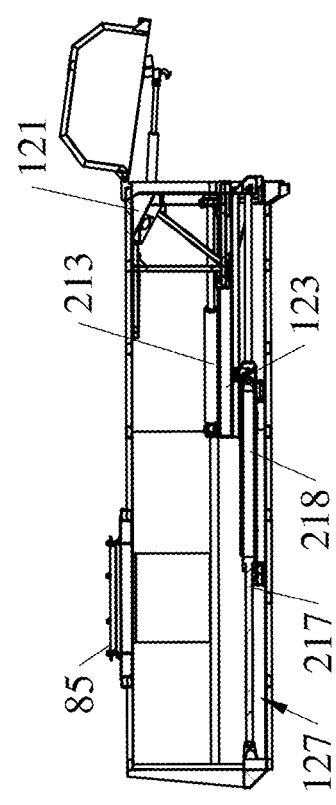

In the fourth stage illustrated in FIGS. 34 and 35, the piston rod of parallel-positioned hydraulic cylinder 218 is extended. Main platen mount 121 and auxiliary platen mount 123 are therefore displaced rearwardly in unison relative to piston holder 127 by a stroke equal to the length of the piston rod of parallel-positioned hydraulic cylinder 218. Refuse is additionally displaced rearwardly by the combined effort of the main platen and the auxiliary platen, which occupy essentially the entire internal vertical dimension of the compaction chamber between the compaction chamber roof to the compaction chamber floor, until they are positioned at, or near to, a rear post 129 of compaction chamber 15. Through the combined effort of the main platen and the auxiliary platen, the refuse being displaced rearwardly is discharged at once from compaction chamber 15.

Following discharge of the refuse, these stages are reversed until main platen mount 121, auxiliary platen mount 123, and piston holder 127 are located at the forwardmost position shown in FIG. 28 and door member 220 is set to a closed position.

These stages of the compacting and discharging operations may be performed manually in response to user manipulation of input elements, following visualization of the interior of the compaction chamber or following review of sensed refuse accumulation data, for example percentage of maximum compaction pressure derived from the force applied on the platen, or maximum weight.

Alternatively, the compacting and discharging operations may be initiated by user manipulation of one or more input elements. Main platen mount 121 is consequently caused to cyclically reciprocate along the refuse-receiving surface of auxiliary platen mount 123 in response to corresponding extension and retraction of oblique hydraulic cylinders 213 during the first and second stages regardless of whether refuse is being introduced through the upper opening of the compaction chamber. Even if some refuse elements are conveyed forwardly and fall onto the compaction chamber floor, they are able to be easily removed from the compaction chamber as described hereinabove. After the compaction chamber is transported to the waste disposal site, an input element 285 (FIG. 39) may be manipulated to cause the door member to be set to an opened position, whereupon the third and fourth stages may be automatically performed in response to sensed conditions.

These four stages are advantageously performed in conjunction with a main platen mount 121, auxiliary platen mount 123 and piston holder 127 of predefined dimensions, in order to accommodate selected payload-suitable dimensions of compaction chamber 15.

With reference to FIGS. 41 and 42, the following are some of the dimensional relations that facilitate efficient compacting operations:
a) The lengthwise dimension K of occluding surface 133 of the main platen mount is approximately equal to the sum of the diameter L of upper opening 85 and an additional distance T representing the compressibility of refuse, e.g. 200 mm.
b) The lengthwise dimension R from upper opening 85 to forward edge 122 of compaction chamber 15 is less than one-quarter of the lengthwise length S of the compaction chamber.
c) The lengthwise dimension M of refuse-receiving surface 151 of the auxiliary platen mount is approximately equal to the sum of the lengthwise dimension N of the support members of the main platen mount, i.e. between laterally extending beams 136b and 136d (FIG. 16), and the lengthwise stroke O of the piston rod of oblique hydraulic cylinders 213.
d) The lengthwise stroke O of the piston rod of oblique hydraulic cylinders 213 is equal to the sum of the diameter L of upper opening 85 and an additional distance T representing the compressibility of refuse, e.g. 200 mm.
e) The lengthwise dimension P between the two separated eyelets 188 of piston holder 127 (FIG. 21), to which corresponding parallel-positioned hydraulic cylinders 217 and 218 are connected, is no longer than dimension M.
f) The vertical dimension MP of main platen 132, which extends downwardly from occluding surface 133 to auxiliary platen mount 123, ranges from 60-90% of the internal vertical dimension H of compaction chamber 15 between the lower surface 86 of the compaction chamber roof to compaction chamber floor 177.
g) The vertical dimension AP of auxiliary platen 154, which extends downwardly from main platen 132 to compaction chamber floor 177, ranges from 10-40% of the internal vertical dimension H of compaction chamber 15.

For example, a compaction chamber having a lengthwise length S of 5200 mm and a width of 2295 mm had an internal vertical dimension H of 1200 mm. The main platen had a vertical dimension MP of 900 mm providing a large MP/H ratio of 0.75. The auxiliary platen, slidingly displaceable along the compaction chamber floor at approximately the same height as a triangular support member end of the piston holder, had a vertical dimension AP of 300 mm. The support members of the main platen mount had a lengthwise dimension N of 1000 mm, which was equal to dimension R, and the lengthwise stroke O of the oblique hydraulic cylinders driving the main platen mount was 1200 mm. The ratio N/S, representing the percentage of the compaction chamber volume unavailable for receiving refuse, was a small value of 0.192.

By virtue of these dimensional relations, the length of compaction chamber 15 is accordingly minimized while main platen mount 121 is able to deflect rearwardly and compress the refuse introduced through upper opening 85, yet main platen mount 121 is able to be located completely forwardly to upper opening 85 at its forwardmost position to enable introduction of the refuse through upper opening 85.

Control System

FIG. 39 schematically illustrates control system 270 that is operable in conjunction with the unloading system and the compacting system. Some components are dispensed with when only the unloading system is employed, or when only the compacting system is employed.

Control system 270 comprises a power take-off (PTO) unit 275, which is configured to couple with engine 272 of the transport vehicle and to transmit torque to one or more hydraulic pumps 276 used for powering an on-board vehicle hydraulic system 281 for use by the unloading and compacting system. The engine also powers other auxiliary components such as air compressor 294 and an air reservoir 296 filled by the compressor, for selectively delivering pressurized air to air brake system 299 and emergency air control 301. Emergency air control 301 is adapted to activate control module 284 pneumatically during periods of electrical outage, so that the unloading system will be able to be operated. Thus the unloading system can be returned to a driving position. PTO 275 may be driven by means of gearbox 277, by means of splined drive shaft 289 powered directly by engine 272, or directly driven by engine 272 via connection means 288.

If engine 272, PTO 275 and hydraulic pumps 276 all malfunction, power can be supplied to the unloading system by emergency hand pump 273.

Hydraulic system 281 comprises manifold block 282 provided with a plurality of conduits, each of extending to a corresponding hydraulic cylinder, a selector module 283 for selecting, whether manually or automatically, which cylinders are to receive pressurized hydraulic fluid, and an electrohydraulic control module 284 for controlling operation of each of the cylinders. Electrohydraulic control module 284 is in data communication with a first group of sensors 287, such as limit switches, which are adapted to sense various actions associated with the unloading system and the compacting system.

Alternatively, pneumatically or electrically actuated, linearly displacing force transmitting elements may be employed for controlling operation of the unloading system and the compacting system in conjunction with the first group of sensors 287.

A logic controller 292 in data communication with engine shutdown unit 295 receives data from a second group of safety related sensors 297. Based on the input from sensors 297, logic controller 292 determines whether to shut down engine 272 in accordance with stored instructions, and commands operation of engine shutdown unit 295 in response to sensed conditions. Alternatively, logic controller 292 commands a drive lock unit 291 with which it is in data communication to prevent transmission 286 from engaging with the drive or reverse gear or to cause engagement of the handbrakes 298.

User input elements interfacing with selector module 283 for selectively activating or deactivating the unloading system and for selectively activating or deactivating the compacting system are generally provided in the cabin of the transport vehicle. Additionally or alternatively, the user input elements may be provided at safety gate 5, for use by personnel located proximately to the above-ground access door of an airplane from which refuse is unloadable, or may be provided at a forward surface of compaction chamber 15, for use by ground-located personnel.

Control system 270 is configured with at least the following ten safety features:
1. According to one embodiment, PTO unit 275 is driven at a given rotational speed by a first shaft of engine-engaged gearbox 277 by means of clutch 278. A second separated shaft of gearbox 277 transmits power for propelling the transport vehicle by means of clutch 279 to transmission 286. Since gearbox 277 changes the rotational speed by selection of a gear, PTO unit 275 is not allowed to be engaged with gearbox 277 to transmit torque to a hydraulic pump 276 while driving. PTO unit 275 is allowed to be operated when logic controller 292 receives a signal transmitted by a sensor 297 associated with gearbox 277 that indicates that the neutral or parking gear has been selected.

2. The transport vehicle cannot be driven when PTO unit 275 is engaged with gearbox 277 and the unloading system or the compacting system is being operated. If the transport vehicle is attempted to be driven, logic controller 292 receives an input from both a first sensor 297 associated with gearbox 277 indicative that one of the driving gears has been selected and from a second sensor 297 indicative that PTO unit 275 is in operation, and commands engine shutdown unit 295 to initiate an engine shutdown procedure or drive lock unit 291 to cause engagement with the parking or neutral gear or with handbrake 298.

3. The transport vehicle cannot be driven when the chute is extended or in an elevated position due to the risk in damage to the chute. A first sensor 297 may be located between the outer 8A and inner chute 8B sections (FIG. 10), to sense when the inner chute section is completely retracted. A second sensor 297 may be located on the side-stop of a chute support 45 (FIG. 40A), to sense when the chute is in a horizontal position and in abutment with the side-stop. Logic controller 292 will override engine shutdown unit 295 to enable engine ignition following reception of data input from the first and second sensors 297.

4. The side-stop of a chute support 45 (FIG. 40A) may be provided with an angle sensor 287 to determine the angular disposition of the chute following operation of vertical-position adjusting piston 72 (FIG. 9). Control module 284 disables operation of lateral-position adjusting piston 101 (FIG. 12) if the chute is disposed at an angle of less than 5-6 degrees from the horizontal plane of chute support 45, or if the chute is not centered with respect to the horizontal plane of chute support 45, to prevent damage to the side-stops.

5. In order to ensure that all refuse introduced into the compaction chamber can be removed therefrom during a compacting operation and to reduce the emission of unpleasant odors from the compaction chamber by avoiding the accumulation of refuse forwardly of the platens, control module 284 disables the operation of parallel-positioned hydraulic cylinders 217 and 218 adapted to displace auxiliary platen mount 123 and piston holder 127 (FIG. 34) if door member 220 is set to a closed position. Structural member 222 of door member 220 (FIG. 36) may be provided with a sensor 287 to determine whether the door member is in an open or closed position.

6. Also, control module 284 disables operation of vertical-position adjusting piston 72 (FIG. 9), length-adjusting piston 89, and lateral-position adjusting piston 101 (FIG. 12) to prevent displacement of the chute if auxiliary platen mount 123 is not disposed at the forwardmost position illustrated in FIG. 29. A forward edge of the compaction chamber may be equipped with a sensor 287 to detect the presence of auxiliary platen mount 123 at the forwardmost position.

7. To protect personnel located proximately to the above-ground airplane access door, air brake system 299 is set to its default braking position, in response to a command by control module 284, when vertical-position adjusting piston 72 (FIG. 9) has been deactivated, to indicate that safety gate 5 has been set in falling preventing relation with respect to the access door. Conversely, air brake system 299 is automatically deactivated when vertical-position adjusting piston 72 has been activated to cause the chute to be separated from the airplane fuselage.

8. To prevent inadvertent damage to the airplane fuselage when the chute is being directed to the airplane access door, safety gate 5 (FIG. 2) may be equipped with a plurality of flexible fingers, e.g. four fingers, extending downwardly from its bottom border element 21, each of which being provided with a tactile sensor to detect contact with the airplane fuselage. Control module 284, after receiving an input from one of these tactile sensors, disables operation of vertical-position adjusting piston 72 (FIG. 9), length-adjusting piston 89, and lateral-position adjusting piston 101 (FIG. 12) to prevent additional displacement of the chute that could damage the airplane. The control system is nevertheless configured to allow retraction of length-adjusting piston 89 even after receiving an input from one of the tactile sensors since a retraction operation of course serves to reduce the possibility of contact with the airplane and to release the chute from the airplane fuselage.

9. Alternatively, the contact detecting apparatus may comprise a safety laser scanner in data communication with control module 284, e.g. the S300 manufactured by SICK AG, Waldkirch, Germany, whereby a sensor mounted on bottom border element 21 of safety gate 5 (FIG. 2) emits a pulse beam that generates a safety light curtain forwardly and to the sides of the safety gate at a range of 100-150 mm. When the pulse beam is reflected by the airplane fuselage at this range, control module 284 disables operation of vertical-position adjusting piston 72 (FIG. 9), length-adjusting piston 89, and lateral-position adjusting piston 101 (FIG. 12) to prevent additional displacement of the chute that could damage the airplane. The control system is nevertheless configured to release and to allow retraction of length-adjusting piston 89 even after receiving an input from the safety laser scanner.

As an added precaution in case the contact detecting apparatus malfunctions, the peripheral border element 6 of safety gate 5 may be provided with an elastomeric peripheral covering 11 (FIG. 3) that prevents damage to the airplane body if inadvertently contacted by safety gate 5.

10. All types of motion carried out by the unloading system, that is by vertical-position adjusting piston 72 (FIG. 9), length-adjusting piston 89, and lateral-position adjusting piston 101 (FIG. 12), are uniform and controlled, so that that the impact of a collision with an airplane body, if at all happening, will be low. Uniform and controlled motion is made possible by the use of standardized hydraulic control valves, for example CETOP 3 and 5 control valves, force-controlling pressure relief valves, speed controlling valves and check valves.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

What is claimed is:
1. A safe airplane-derived refuse unloading system, comprising:
 a) a chamber for receiving airplane-derived refuse;
 b) a vertically displaceable chute in communication with said receiving chamber, along which the refuse gravitates and from which it is dischargeable to said receiving chamber;

c) a safety gate connected to said chute, wherein said safety gate has an upper section and a lower section and is settable in falling preventing relation with respect to an above-ground access door of an airplane from which the refuse is unloadable when said safety gate is substantially vertically oriented to ensure that an entire height of said safety gate, including said upper section and said lower section, is positioned sufficiently close to an entire peripheral border of said access door to prevent a person leaning out of said access door from falling, said safety gate configured with an upper border element over which refuse elements are transferable via said access door into said chute; and d) a mechanical spring-based brake assembly operatively connected to said safety gate, for immobilizing said safety gate when said chute ceases to be vertically displaced.

2. The unloading system according to claim 1, wherein the receiving chamber is fixedly mounted on top of a platform of a transport vehicle and the chute is displaceable along two or more degrees of freedom to facilitate directing the safety gate to the access door, the unloading system further comprising a control system for preventing propulsion of the transport vehicle when the chute is being displaced.

3. The unloading system according to claim 2, wherein the safety gate is of openwork construction with a plurality of adjacent bordered openings for weight savings and for preventing obstruction of a line of sight of a driver of the transport vehicle when the chute is lowered to a lowermost position substantially parallel to a ground surface.

4. The unloading system according to claim 1, further comprising a funnel member operatively connected to the receiving chamber and to the chute, through which the gravitationally delivered airplane-derived refuse is discharged into the receiving chamber.

5. The unloading system according to claim 4, further comprising a lateral-position adjusting mechanism connected to an upper region of the receiving chamber and to a region of the funnel member.

6. The unloading system according to claim 5, wherein the funnel member is configured with an upper receiving compartment, a lower refuse transfer compartment, and a mounting plate therebetween that surrounds an upper edge of said refuse transfer compartment;

wherein the region of the funnel member to which the lateral-position adjusting mechanism is connected is an annular rim extending outwardly from a bottom circular edge of the refuse transfer compartment, said rim being connected to a bearing fitted within an upper roof of the receiving chamber and around a circular wall delimiting an opening through which the transferred refuse is introduced into an interior of the receiving chamber.

7. The unloading system according to claim 6, wherein the lateral-position adjusting mechanism comprises a lateral-position adjusting piston pivotally connected to the upper region of the receiving chamber, a straight link pivotally connected to the upper region of the receiving chamber, and an arcuate link which is pivotally connected at a first end to an appendage fixedly connected to the annular rim and which is pivotally connected at a second end to an end of said straight link together with a terminal end of a rod of said lateral-position adjusting piston, to facilitate rotation of the funnel member at a substantially uniform speed in each rotational direction in order to adjust the lateral position of the chute.

8. The unloading system according to claim 6, wherein the funnel member is additionally configured with two pairs of apertured supports extending upwardly from the mounting plate and proximate to a chute-facing edge thereof to facilitate pivotal displacement of the chute about a horizontal axis defined by a pin inserted within each of said apertured supports and within corresponding apertured supports protruding proximate to a funnel-facing end of the chute; a sloped brace extending downwardly from the chute-facing edge of the mounting plate; and a pair of apertured supports projecting from a bottom of the sloped brace for pivotal connection with a vertical-position adjusting piston, wherein a rod of the vertical-position adjusting piston is pivotally connected to an intermediate region of the chute by a force multiplier arrangement.

9. The unloading system according to claim 1, wherein the chute has an upwardly facing opening, and is configured with outer and inner sections that are slidable one with relation to the other, and with a length-adjusting piston interconnecting said outer and inner sections in order to facilitate an extension or retraction operation.

10. The unloading system according to claim 1, wherein the safety gate has:

a) a curved profile with the upper substantially vertical section and the lower section that downwardly and concavely curves from a region at a bottom of the vertical section in such a way that a bottom border element of the safety gate is more spaced from the chute than the vertical section in order to accommodate curvature of a fuselage of the airplane from which the refuse is unloadable; or b) a peripheral border which includes the bottom border element that is adapted to be positioned at approximately a height of an airplane cabin floor, opposed lower side border elements that extend upwardly from, and substantially perpendicular to, the bottom border element and that have a width therebetween greater than the width of the access door, opposed upper side border elements that are laterally spaced by a width therebetween narrower than the width between the lower side border elements to prevent interference with upper hinges of the access door which is opened, and the upper border element which is located above and between the lower side border elements; or c) two bars which are each fixedly connected to the chute and pivotally connected to a chute-facing region of the safety gate to define a pivot axis, and one or more counterweights connected to the safety gate and located below the pivot axis when the safety gate is set in the falling preventing relation with respect to the access door, wherein a weight and relative location of said one or more counterweights are selected to produce a counterbalancing, self-righting moment about the pivot axis following a controlled movement of the chute; or d) a height defined by the lower side border elements and the upper side border elements of at least 1050 mm; or e) an elastomeric peripheral covering coupled to the peripheral border for preventing damage to an airplane body if inadvertently contacted by the safety gate.

11. The unloading system according to claim 10, wherein an entire height of the safety gate, the safety gate having the curved profile with the upper substantially vertical section and the lower section that downwardly and concavely curves from the region at a bottom of the vertical section in such a way that the bottom border element of the safety gate is more spaced from the chute than the vertical section in order to accommodate curvature of a fuselage of the airplane from which the refuse is unloadable, is settable in the falling preventing relation with respect to the access door, and is spaced by no more than 10 cm from the peripheral border of the access door, when set in the falling preventing relation with the access door, to prevent a person leaning out of the access door from falling.

12. The unloading system according to claim 10, wherein the chute is also laterally and linearly displaceable, the unloading system further comprising contact detecting apparatus in data communication with a control module, said control module operable to disable movement of the chute when approaching the airplane by a distance of less than 150 mm.

13. The unloading system according to claim 1, wherein the receiving chamber is a compaction chamber, the unloading system further comprising a compacting system provided within the compaction chamber for compacting the received airplane-derived refuse.

14. The unloading system according to claim 1, wherein the brake assembly is an air brake assembly.

15. The unloading system according to claim 14, wherein the safety gate is pivotally displaceable, and wherein the air brake assembly comprises a pneumatically releasable lock cylinder and a bar that is pivotally connected at one end to said safety gate and is received within an interior of said lock cylinder, so as to be axially displaced within a bore when said safety gate is pivoted.

16. The unloading system according to claim 15, wherein the lock cylinder is configured with a spring that is biased to radially displace the bar to a wall of the bore and to thereby apply a locking force onto the bar that immobilizes the safety gate to prevent personnel from accidently falling through the access door by preventing the bar from pivoting when the chute ceases to be vertically displaced, wherein the bar is displaceable in an opposite radial direction by a pulse of air that is injected into an air inlet when the safety gate is to undergo a vertical displacement in conjunction with the vertically displaceable chute.

17. A safe airplane-derived refuse unloading system, comprising:
   a) a chamber for receiving airplane-derived refuse;
   b) a vertically displaceable chute upwardly and downwardly in communication with said receiving chamber, along which the refuse gravitates and from which it is dischargeable to said receiving chamber; and
   c) a safety gate connected to said chute, wherein said safety gate has an upper section and a lower section and is settable in falling preventing relation with respect to an above-ground access door of an airplane from which the refuse is unloadable when said safety gate is substantially vertically oriented to ensure that an entire height of said safety gate, including said upper section and said lower section, is positioned sufficiently close to an entire peripheral border of said access door to prevent a person leaning out of said access door from falling, said safety gate configured with an upper border element over which refuse elements are transferable via said access door into said chute,
   wherein said safety gate is of openwork construction made of impact resistant material with a plurality of adjacent bordered openings formed between a bottom border element of said safety gate and said upper border element for weight savings and for preventing obstruction of a line of sight of a driver of a transport vehicle (12) provided with said system when said chute is lowered to a lowermost position substantially parallel to a ground surface.

18. The unloading system according to claim 17, wherein the safety gate is pivotally displaceable, the unloading system further comprising an air brake assembly comprising a pneumatically releasable lock cylinder and a bar that is pivotally connected at one end to said safety gate and is received within an interior of said lock cylinder, so as to be axially displaced within a bore when said safety gate is pivoted, wherein said lock cylinder is configured with a spring that is biased to radially displace said bar to a wall of the bore and to thereby apply a locking force onto said bar that immobilizes said safety gate by preventing said bar from pivoting when said chute ceases to be vertically displaced, wherein said bar is displaceable in an opposite radial direction by a pulse of air that is injected into an air inlet when said safety gate is to undergo a vertical displacement in conjunction with the vertically displaceable chute.

19. The unloading system according to claim 17, wherein the receiving chamber is fixedly mounted on top of a platform of a transport vehicle and the chute is displaceable along two or more degrees of freedom to facilitate directing the safety gate to the access door, the unloading system further comprising a control system for preventing propulsion of the transport vehicle when the chute is being displaced.

\* \* \* \* \*